United States Patent
Bouchard et al.

(10) Patent No.: US 8,923,306 B2
(45) Date of Patent: Dec. 30, 2014

(54) PHASED BUCKET PRE-FETCH IN A NETWORK PROCESSOR

(71) Applicant: Cavium, Inc., San Jose, CA (US)

(72) Inventors: Gregg A. Bouchard, Georgetown, TX (US); Rajan Goyal, Saratoga, CA (US)

(73) Assignee: Cavium, Inc., San Jose, CA (US)

( * ) Notice: Subject to any disclaimer, the term of this patent is extended or adjusted under 35 U.S.C. 154(b) by 123 days.

(21) Appl. No.: 13/843,353

(22) Filed: Mar. 15, 2013

(65) Prior Publication Data

US 2013/0239193 A1    Sep. 12, 2013

Related U.S. Application Data

(63) Continuation-in-part of application No. 13/565,422, filed on Aug. 2, 2012, now Pat. No. 8,472,452.

(60) Provisional application No. 61/514,344, filed on Aug. 2, 2011, provisional application No. 61/514,382, filedon Aug. 2, 2011, provisional application No. 61/514,379, filed on Aug. 2, 2011, provisional application No. 61/514,400, filed on Aug. 2, 2011, (Continued)

(51) Int. Cl.
| | |
|---|---|
| *H04L 12/28* | (2006.01) |
| *H04L 29/06* | (2006.01) |
| *H04L 12/743* | (2013.01) |
| *H04L 12/747* | (2013.01) |
| *H04L 12/851* | (2013.01) |
| *H04L 29/08* | (2006.01) |
| *H04L 12/773* | (2013.01) |

(52) U.S. Cl.
CPC ............ *H01L 63/08* (2013.01); *H04L 63/0227* (2013.01); *H04L 45/7457* (2013.01); *H04L 45/742* (2013.01); *H04L 47/2441* (2013.01); *H04L 67/327* (2013.01); *H04L 69/22* (2013.01); *H04L 45/60* (2013.01)
USPC ........................................................ 370/400

(58) Field of Classification Search
None
See application file for complete search history.

(56) References Cited

U.S. PATENT DOCUMENTS

| | | | |
|---|---|---|---|
| 6,778,530 | B1 | 8/2004 | Greene |
| 8,127,112 | B2 | 2/2012 | Rhoades et al. |

(Continued)

FOREIGN PATENT DOCUMENTS

EP     1 515 500 A2    3/2005

OTHER PUBLICATIONS

Notification of Transmittal of International Search Report and Written Opinion of the International Searching Authority of PCT/US2012/049383, "Lookup Cluster Complex," dated Oct. 5, 2012.

(Continued)

*Primary Examiner* — John Blanton
(74) *Attorney, Agent, or Firm* — Hamilton, Brook, Smith & Reynolds, P.C.

(57) ABSTRACT

A packet processor provides for rule matching of packets in a network architecture. The packet processor includes a lookup cluster complex having a number of lookup engines and respective on-chip memory units. The on-chip memory stores rules for matching against packet data. Each of the lookup engines receives a key request associated with a packet and determines a subset of the rules to match against the packet data. Based on a prefetch status, a selection of the subset of rules are retrieved for rule matching. As a result of the rule matching, the lookup engine returns a response message indicating whether a match is found.

19 Claims, 24 Drawing Sheets

Related U.S. Application Data provisional application No. 61/514,406, filed on Aug. 2, 2011, provisional application No. 61/514,407, filed on Aug. 2, 2011, provisional application No. 61/514,438, filed on Aug. 2, 2011, provisional application No. 61/514,447, filed on Aug. 2, 2011, provisional application No. 61/514,450, filed on Aug. 2, 2011, provisional application No. 61/514,459, filed on Aug. 2, 2011, provisional application No. 61/514,463, filed on Aug. 2, 2011.

(56) References Cited

U.S. PATENT DOCUMENTS

| | | |
|---|---|---|
| 8,472,452 B2 | 6/2013 | Goyal et al. |
| 8,516,241 B2 | 8/2013 | Chang et al. |
| 8,719,331 B2 | 5/2014 | Goyal et al. |
| 2003/0058864 A1 | 3/2003 | Michels et al. |
| 2005/0013293 A1 | 1/2005 | Sahita |
| 2009/0083209 A1 | 3/2009 | Cor, Jr. et al. |
| 2011/0083000 A1 | 4/2011 | Rhoades et al. |
| 2011/0231510 A1 | 9/2011 | Korsunsky et al. |
| 2013/0019277 A1 | 1/2013 | Chang et al. |
| 2013/0036151 A1 | 2/2013 | Goyal et al. |
| 2013/0250948 A1 | 9/2013 | Goyal et al. |
| 2013/0312056 A1 | 11/2013 | Chang et al. |

OTHER PUBLICATIONS

Notification Concerning Transmittal of International Preliminary Report on Patentability of PCT/US2012/049383, "Lookup Cluster Complex," date of mailing Feb. 13, 2014.

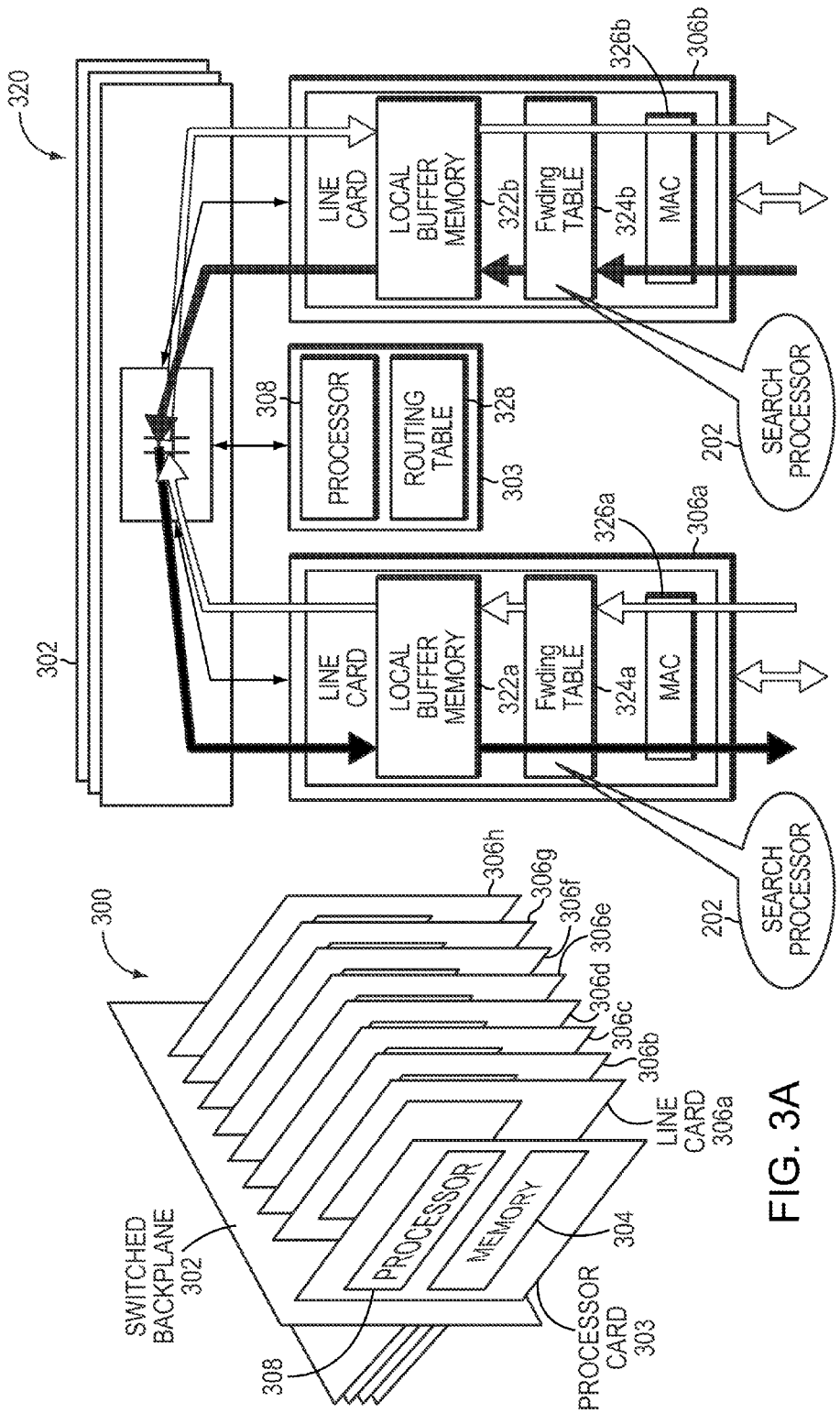

PHASED BUCKET PRE-FETCH IN A NETWORK PROCESSOR

RELATED APPLICATIONS

This application is a continuation-in-part of U.S. application Ser. No. 13/565,422, filed on Aug. 2, 2012, which claims the benefit of U.S. Provisional Application No. 61/514,344, filed on Aug. 2, 2011; U.S. Provisional Application No. 61/514,382, filed on Aug. 2, 2011; U.S. Provisional Application No. 61/514,379, filed on Aug. 2, 2011; U.S. Provisional Application No. 61/514,400, filed on Aug. 2, 2011; U.S. Provisional Application No. 61/514,406, filed on Aug. 2, 2011; U.S. Provisional Application No. 61/514,407, filed on Aug. 2, 2011; U.S. Provisional Application No. 61/514,438, filed on Aug. 2, 2011; U.S. Provisional Application No. 61/514,447, filed on Aug. 2, 2011; U.S. Provisional Application No. 61/514,450, filed on Aug. 2, 2011; U.S. Provisional Application No. 61/514,459, filed on Aug. 2, 2011; and U.S. Provisional Application No. 61/514,463, filed on Aug. 2, 2011. The entire teachings of the above applications are incorporated herein by reference.

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY

Example embodiments of the present disclosure provide methods of processing a packet. A key request is received, the key request being a request to lookup one or more associated rules for application against information in an associated packet. The key request includes a key and a table identifier (TID), the key including data extracted from the packet. The key is parsed to extract at least one field. At least one entry in a tree access table indicated by the TID is selected, the entry providing a starting address of a path to a set of rules stored in a memory.

The entry is then processed, based on the at least one field, to determine at least one bucket having a prefetch status and an ordered set of bucket entries. The bucket entries include pointers to a subset of rules, which is a portion of the set of rules. A selection of the subset of rules, as determined from the prefetch status, is then retrieved from the memory, and the at least one field is applied against the subset of rules. Based on this application, a response signal is output to indicate whether the at least one field matches at least one rule of the subset of rules.

In further embodiments, the at least one field may be applied against each subset of rules independent of an order of the respective bucket entries. Alternatively, the at least one field is applied against each subset of rules in parallel. In response to the response signal indicating a match, the process of retrieving additional subsets of rules for the ordered set of bucket entries can be terminated. The prefetch status may include an indication to enable or disable a prefetch of the selection of the subsets of rules from the memory. In response to a disable indication, the subsets of rules may be retrieved in an order corresponding to the ordered set of bucket entries, and the at least one field may be applied against the subsets of rules serially in an order corresponding to the ordered set of bucket entries.

In still further embodiments, the prefetch status may include an indication of a number of bucket entries in the selection. In response to the response signal indicating no match, a further selection of the subset of rules may be retrieved from the memory. The further selection may be distinct from the selection, corresponding to bucket entries excluded from the initial retrieval corresponding to the prefetch status.

In further embodiments, the lookup request may include a key format table index, and parsing the key is based on the key format table index. The set of rules may be a portion of a larger set of rules stored in the memory. The at least one bucket may include a plurality of buckets, the entry including a node associated with the plurality of buckets, and processing the entry may include processing the node to determine the plurality of buckets. Further, the node may be associated with the plurality of buckets via at least one intermediary node.

In still further embodiments, the subset of rules may be ordered by priority, and the at least one field may be applied against the subset of rules in descending order of priority. The response signal may be output after a first match between the at least one field and the subset of rules is located. Further, the process of applying the at least one field against the subset of rules is stopped after the first match is located. Further, a plurality of entries may be selected in the tree access table indicated by the TID. Rule match results may be selected among a plurality of match results based on a predetermined priority, where each match result corresponds to one of the plurality of entries.

In yet further embodiments, an apparatus for processing a packet may include a lookup cluster. The lookup cluster may be configured to receive a key request, the key request being a request to lookup one or more associated rules for application against information in an associated packet. The key request includes a key and a table identifier (TID), the key including data extracted from the packet. The lookup cluster may parse the key to extract at least one field, and select at least one entry in a tree access table indicated by the TID, the entry providing a starting address of a path to a set of rules stored in a memory.

The lookup cluster includes a tree-walk engine (TWE) configured to process the entry, based on the at least one field, to determine at least one bucket, the at least one bucket including a prefetch status and an ordered set of bucket entries. The bucket entries include pointers to a subset of rules, the subset of rules being a portion of the set of rules. Further, a bucket-walk engine (BWE) may be configured to retrieve a selection of the subset of rules from the memory, the selection being determined by the prefetch status. A rule-matching engine (RME) may be configured to apply the at least one field against the subset of rules. The lookup cluster may then output a response signal indicating whether the at least one field matches at least one rule of the subset of rules.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3A is a diagram of an example embodiment of a router architecture.

FIG. 3B is a block diagram illustrating an example embodiment of a router employing a search processor.

DETAILED DESCRIPTION

Figure 1:
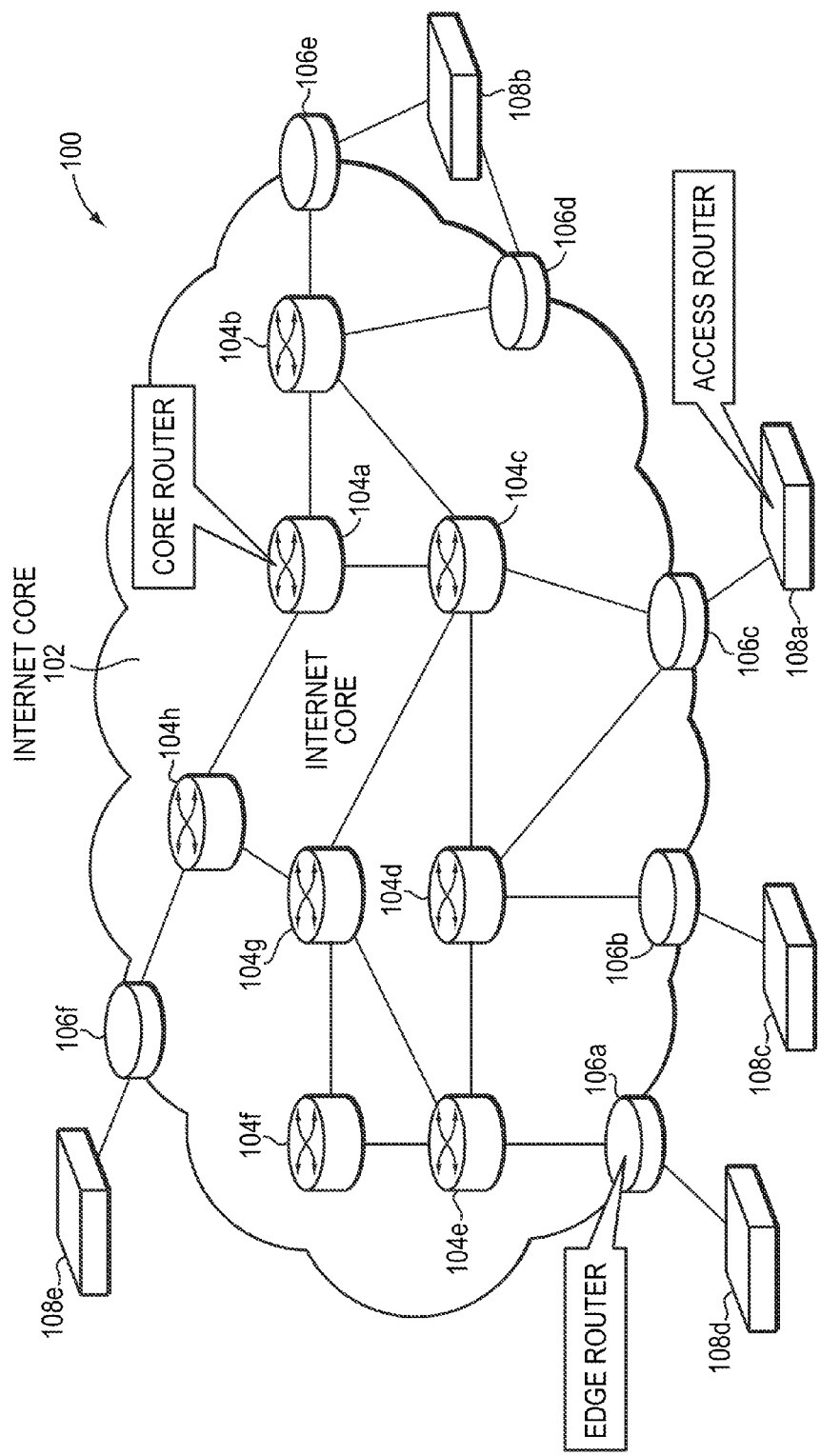
FIG. 1 is a block diagram of a typical network topology including network elements employing example embodiments of a search processor described in this application.

Although packet classification has been widely studied for a long time, researchers are still motivated to seek novel and efficient packet classification solutions due to: i) the continued growth of network bandwidth, ii) increasing complexity of network applications, and iii) technology innovations of network systems.

Explosion in demand for network bandwidth is generally due to the growth in data traffic. Leading service providers report bandwidths doubling on their backbone networks about every six to nine months. As a consequence, novel packet classification solutions are required to handle the exponentially increasing traffics on both edge and core devices.

Complexity of network applications is increasing due to the increasing number of network applications being implemented in network devices. Packet classification is widely used for various kinds of applications, such as service-aware routing, intrusion prevention and traffic shaping. Therefore, novel solutions of packet classification must be intelligent to handle diverse types of rule sets without significant loss of performance.

In addition, new technologies, such as multi-core processors provide unprecedented computing power, as well as highly integrated resources. Thus, novel packet classification solutions must be well suited to advanced hardware and software technologies.

Existing packet classification algorithms trade memory for time. Although the tradeoffs have been constantly improving, the time taken for a reasonable amount of memory is still generally poor.

Because of problems with existing algorithmic schemes, vendors use ternary content-addressable memory (TCAM), which uses brute-force parallel hardware to simultaneously check packets against all rules. The main advantages of TCAMs over algorithmic solutions are speed and determinism (TCAMs work for all databases).

A TCAM is a hardware device that functions as a fully associative memory. A TCAM cell stores three values: 0, 1, or 'X,' which represents a don't-care bit and operates as a per-cell mask enabling the TCAM to match rules containing wildcards, such as a kleene star '*'. In operation, a whole packet header can be presented to a TCAM to determine which entry (rule) it matches. However, the complexity of TCAMs has allowed only small, inflexible, and relatively slow implementations that consume a lot of power. Therefore, a need continues for efficient algorithmic solutions operating on specialized data structures.

Current algorithmic methods remain in the stages of mathematical analysis and/or software simulation (observation based solutions).

Proposed mathematic solutions have been reported to have excellent time/special complexity. However, methods of this kind have not been found to have any implementation in real-life network devices because mathematical solutions often add special conditions to simplify a problem and/or omit large constant factors which might conceal an explicit worst-case bound.

Proposed observation based solutions employ statistical characteristics observed in rules to achieve efficient solution for real-life applications. However, these algorithmic methods generally only work well with specific type of rule sets. Because packet classification rules for difference applications have diverse features, few observation based methods are able to fully exploit redundancy in different types of rule sets to obtain stable performance under various conditions.

Packet classification is performed using a packet classifier, also called a policy database, flow classifier, or simply a classifier. A classifier is a collection of rules or policies. Packets received are matched with rules, which determine actions to take with a matched packet. Generic packet classification requires a router to classify a packet on the basis of multiple fields in a header of the packet. Each rule of the classifier specifies a class that a packet may belong to according to criteria on 'F' fields of the packet header and associates an identifier (e.g., class ID) with each class. For example, each rule in a flow classifier is a flow specification, in which each flow is in a separate class. The identifier uniquely specifies an action associated with each rule. Each rule has 'F' fields. An ith field of a rule R, referred to as R[i], is a regular expression on the ith field of the packet header. A packet P matches a particular rule R if for every i, the ith field of the header of P satisfies the regular expression R[i].

Classes specified by the rules may overlap. For instance, one packet may match several rules. In this case, when several rules overlap, an order in which the rules appear in the classifier determines the rules relative priority. In other words, a packet that matched multiple rules belongs to the class identified by the identifier (class ID) of the rule among them that appears first in the classifier. In further embodiments, a priority indication may be provided with each rule.

Packet classifiers may analyze and categorize rules in a classifier table and create a decision tree that is used to match received packets with rules from the classifier table. A decision tree is a decision support tool that uses a tree-like graph or model of decisions and their possible consequences, including chance event outcomes, resource costs, and utility. Decision trees are commonly used in operations research, specifically in decision analysis, to help identify a strategy most likely to reach a goal. Another use of decision trees is as a descriptive means for calculating conditional probabilities. Decision trees may be used to select match a received packet with a rule in a classifier table to determine how to process the received packet.

FIG. 1 is a block diagram 100 of a typical network topology including network elements employing example embodiments of a search processor. The network topology includes an Internet core 102 including a plurality of core routers 104a-h. Each of the plurality of core routers 104a-h are connected to at least one other of the plurality of core routers 104a-h. Core routers 104a-h that are on the edge of the Internet core 102 (i.e., core routers 104b-e and 104h) are coupled with at least one edge router 106a-f. Each edge router 106a-f is coupled to at least one access router 108a-e.

The core routers 104a-h are configured to operate in the Internet core 102 or Internet backbone. The core routers 104a-h are configured to support multiple telecommunications interfaces of the Internet core 102 and are further configured to forward packets at a full speed of each of the multiple telecommunications protocols.

The edge routers 106a-f are placed at the edge of the Internet core 102. Edge routers 106a-f bridge access routers 108a-e outside the Internet core 102 and core routers 104a-h in the Internet core 102. Edge routers 106a-f can be configured to employ a bridging protocol to forward packets from access routers 108a-e to core routers 104a-h and vice versa.

The access routers 108a-e can be routers used by an end user, such as a home user or an office, to connect to one of the edge routers 106a-f, which in turn connects to the Internet core 102 by connecting to one of the core routers 104a-h. In this manner, the edge routers 106a-f can connect to any other edge router 106a-f via the edge routers 106a-f and the interconnected core routers 104a-h.

The search processor described herein can reside in any of the core routers 104a-h, edge routers 106a-f, and access routers 108a-e. The search processor described herein, within each of these routers, is configured to analyze Internet protocol (IP) packets based on a set of rules and forward the IP packets along an appropriate network path.

Figure 2A:
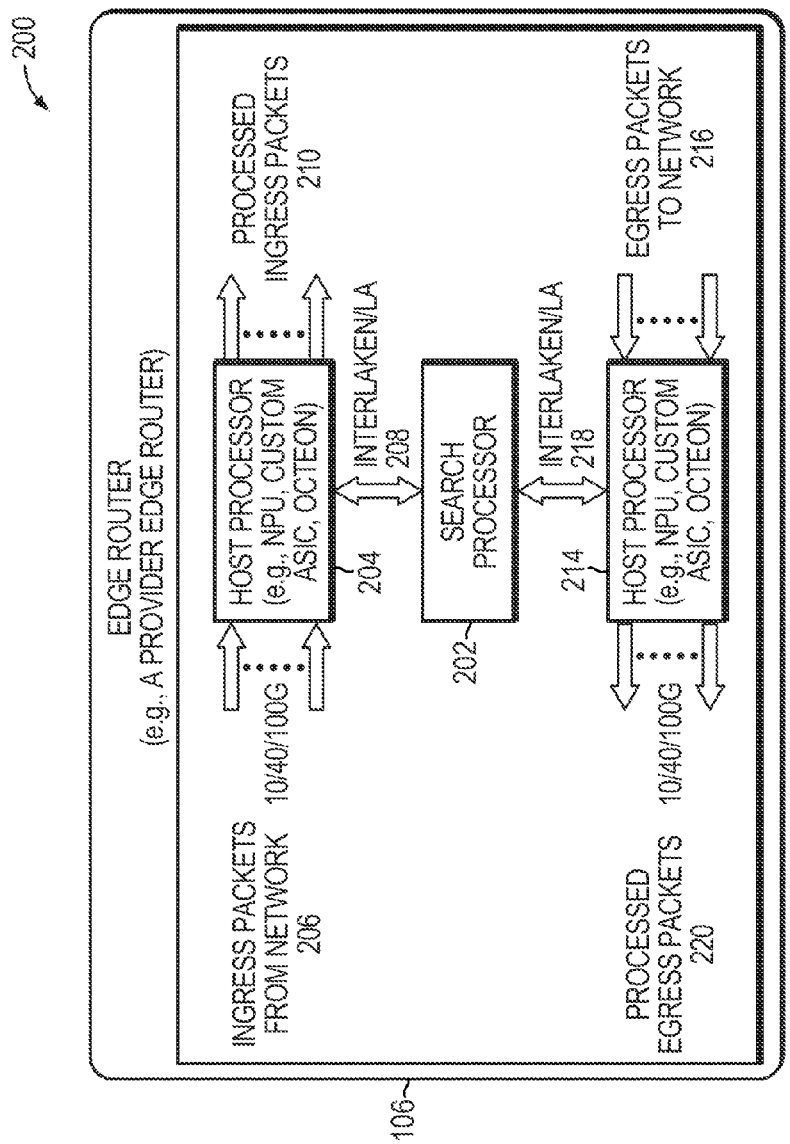
FIGS. 2A-2C are block diagrams illustrating example embodiments of a search processor employed in routers.

FIG. 2A is a block diagram 200 illustrating an example embodiment of a search processor 202 employed in an edge router 106. An edge router 106, such as a provider edge router, includes the search processor 202, a first host processor 204 and a second host processor 214. The first host processor 204 is configured as an ingress host processor. The first host processor 204 receives ingress packets 206 from a network. The first host processor 204 forwards a lookup request including a packet header (or field) from the ingress packets 206 to the search processor 202 using an Interlaken interface 208. The search processor 202 then processes the packet header using a plurality of rule processing engines employing a plurality of rules to determine a path to forward the ingress packets 206 on the network. The search processor 202, after processing the lookup request with the packet header, forwards the path information to the first host processor 204, which forwards the processed ingress packets 210 to another network element in the network.

Likewise, the second host processor 214 is an egress host processor. The second host processor 214 receives egress packets to send from the network 216. The second host processor 214 forwards a lookup request with a packet header (or field) from the egress packets 216 to the search processor 202 over a second Interlaken interface 218. The search processor 202 then processes the packet header using a plurality of rule processing engines employing a plurality of rules to determine a path to forward the packets on the network. The second host processor 214 forwards the processed egress packets 220 to another network element in the network.

Figure 2B:
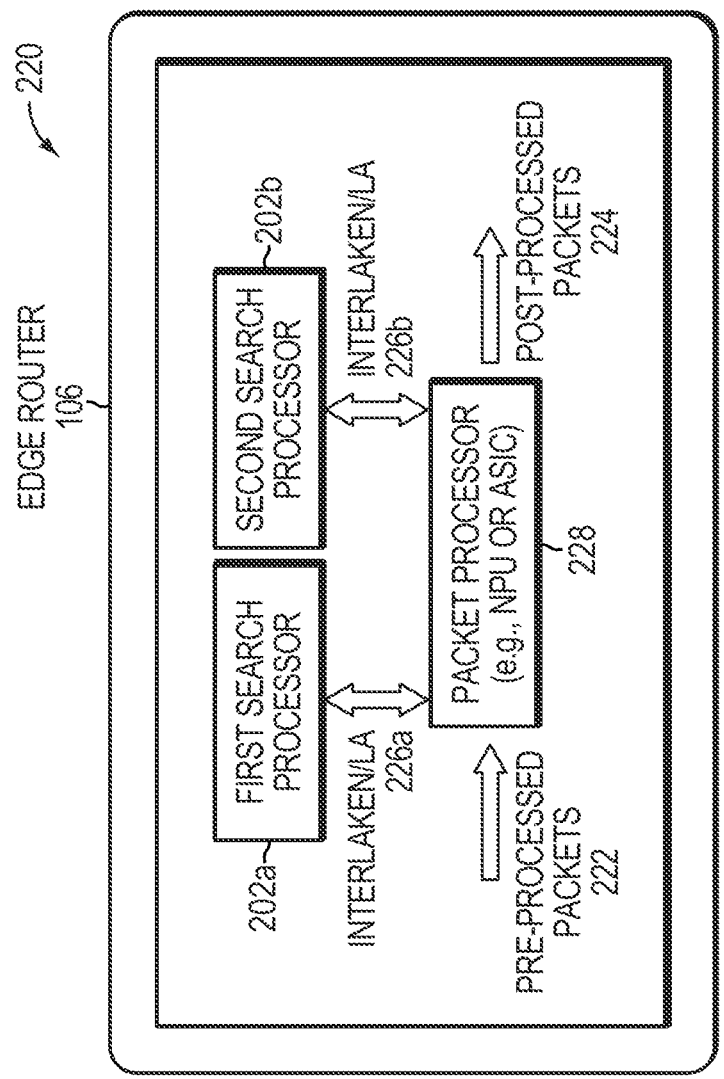

FIG. 2B is a block diagram 220 illustrating another example embodiment of an edge router 106 configured to employ the search processor 202. In this embodiment, the edge router 106 includes a plurality of search processors 202, for example, a first search processor 202a and a second search processor 202b. The plurality of search processors 202a-b are coupled to a packet processor 228 using a plurality of Interlaken interfaces 226a-b, respectively. The plurality of search processors 202a-b can be coupled to the packet processor 228 over a single Interlaken and interface. The edge router 106 receives a lookup request with a packet header (or fields) of pre-processed packets 222 at the packet processor 228. One of the search processors 202a-b searches the packet headers for an appropriate forwarding destination for the pre-processed packets 222 based on a set of rules and data within the packet header, and responds to the lookup request to the packet processor 228. The packet processor 228 then sends the post processed packets 224 to the network based on the lookup request performed by the search processors 202a-b.

Figure 2C:
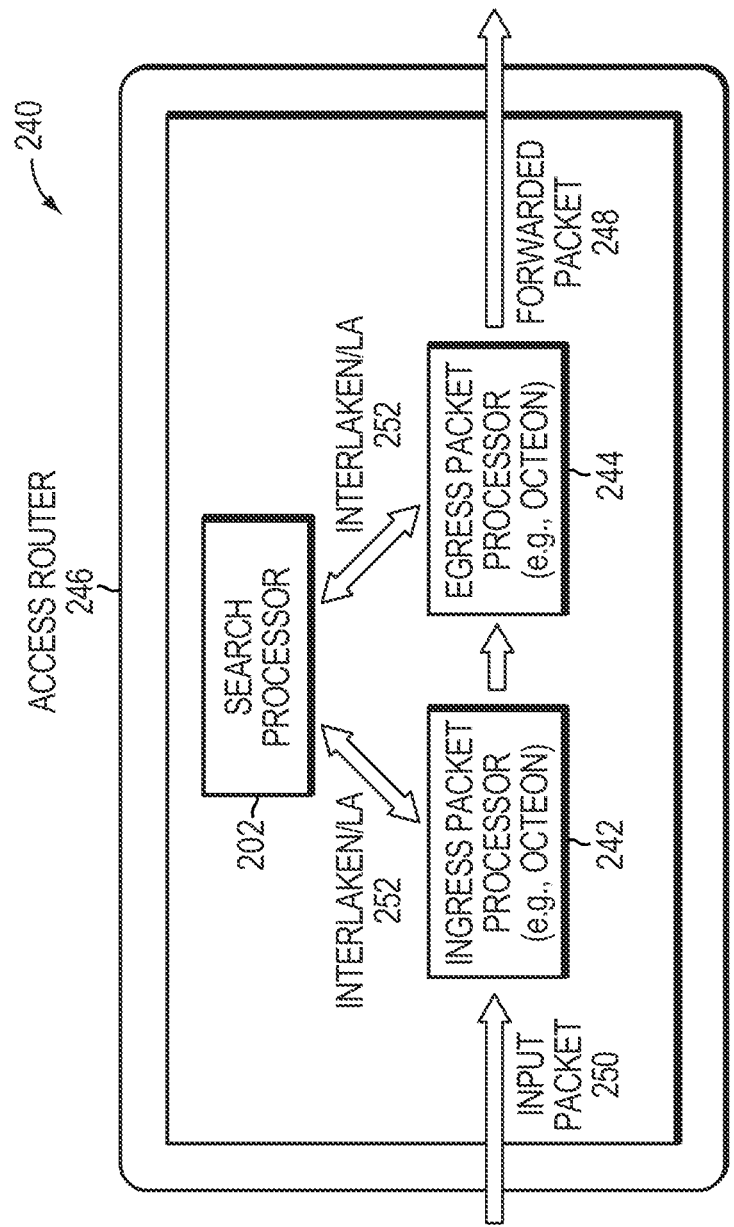

FIG. 2C is a block diagram 240 illustrating an example embodiment of an access router 246 employing the search processor 202. The access router 246 receives an input packet 250 at an ingress packet processor 242. The ingress packet processor 242 then forwards a lookup request with a packet header of the input packet 250 to the search processor 202. The search processor 202 determines, based on packet header of the lookup request, a forwarding path for the input packet 250 and responds to the lookup requests over the Interlaken interface 252 to the egress packet processor 244. The egress packet processor 244 then outputs the forwarded packet 248 to the network.

FIG. 3A is a diagram 300 of an example embodiment of a router architecture. The router architecture includes a switched backplane 302 coupled with a processor card 303 that includes a processor 308 and a memory 304. The switched backplane 302 is further coupled with a plurality of line cards 306a-h. Each line card 306a-h includes a search processor as described herein.

FIG. 3B is a block diagram 320 illustrating an example embodiment of a router employing the search processor 202. The router includes the switched backplane 302 which is coupled to the line cards 306a-b and the processor card 303. The processor card 303 includes a processor 308 and a routing table 328, which can be stored in the memory 304 of the processor card 303. Each line card 306a-b includes a respective local buffer memory 322a-b, a forwarding table 324a-b, and a media access control (MAC) layer 326a-b. The search processor 202 exists within the forwarding table 324a-b of the line card 306a-b.

As an example, a packet is received by the line card 306a at the MAC layer 326a. The MAC layer 326a sends the packet to the forwarding table 324a. Then, the packet and appropriate forwarding table information is stored in the local buffer memory 322a. The processor card 303 then accesses its routing table 328 to determine where to forward the received packet. Based on the determination, the router selects an appropriate line card 306b, stores the packet and forwarding information in the local buffer memory 322b of the appropriate line card, and forwards the packet out to the network.

Figures 3C, 3D:
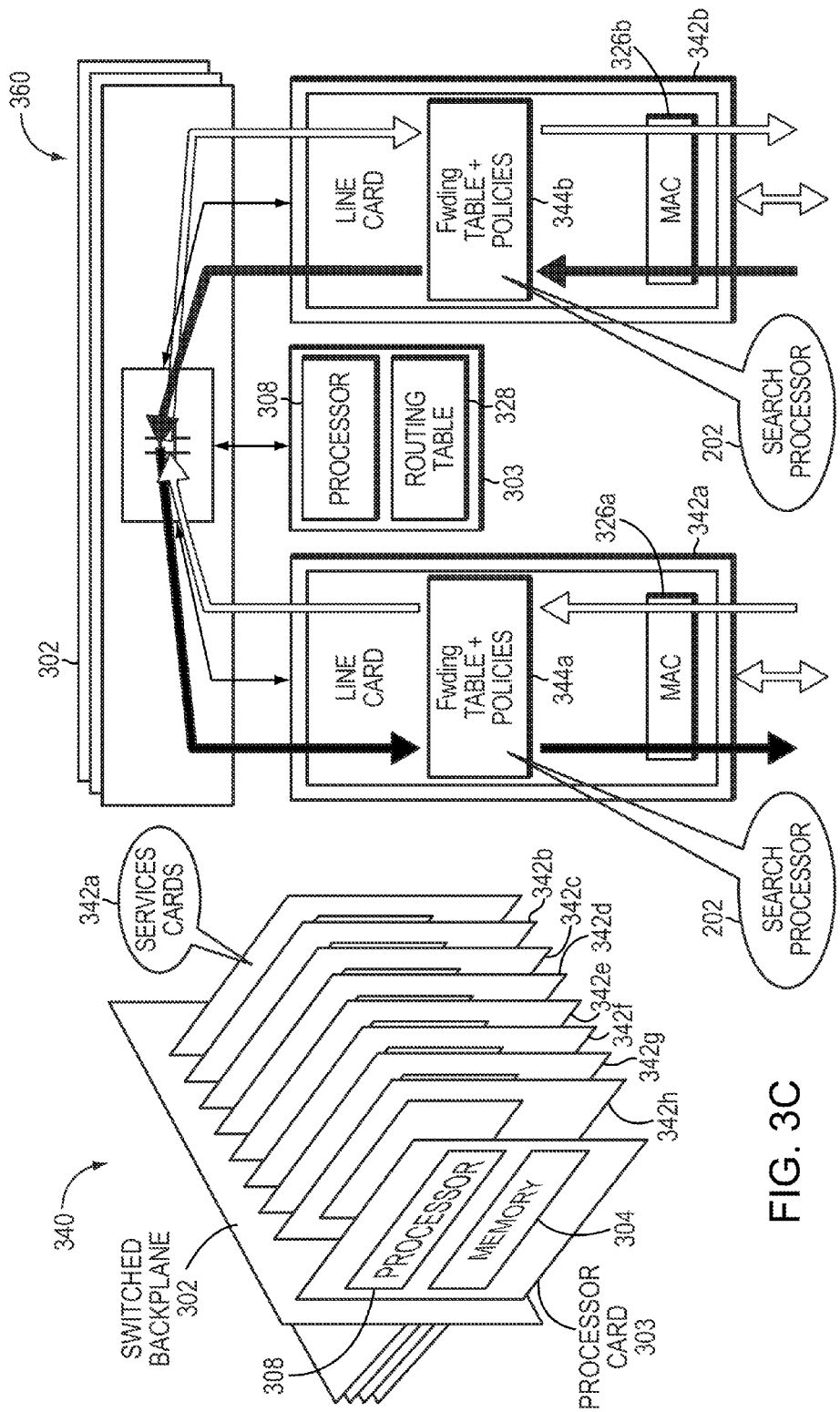
FIG. 3C is a block diagram of another embodiment of a router including a switched backplane.
FIG. 3D is a block diagram illustrating an example embodiment of a router employing a search processor.

FIG. 3C is a block diagram 340 of another embodiment of a router including the switched backplane 302. The switched backplane 302 is coupled to the processor card 303, the line cards 342b-h, and a service card 342a. The processor card 303 includes the memory 304 and the processor 308. The service card 342a is a type of line card 342a-h. Further, the search processor described herein can also exist on the service card 342a.

FIG. 3D is a block diagram 360 illustrating an example embodiment of a router employing the switched backplane 302. The switched backplane 302 is coupled with the processor card 303 and the service card 342a or line cards 342b-h. The line cards 342a-b can either be a service card 342a or line card 342b-h. The line card 342a-b includes a forwarding table and corresponding policies module 344a-b, and a MAC layer 326a-b. The search processor 202 is included in the line card 342a-b. The line card 342a receives a packet from a network through the MAC layer 346a at the forwarding table and policies module 344a. The search processor 202 processes the packet according to the forwarding table and policies module 344a according to the routing table 328 in the processor card 303 and forwards the packet to an appropriate line card 342b to be forwarded into the network.

Figure 4A:
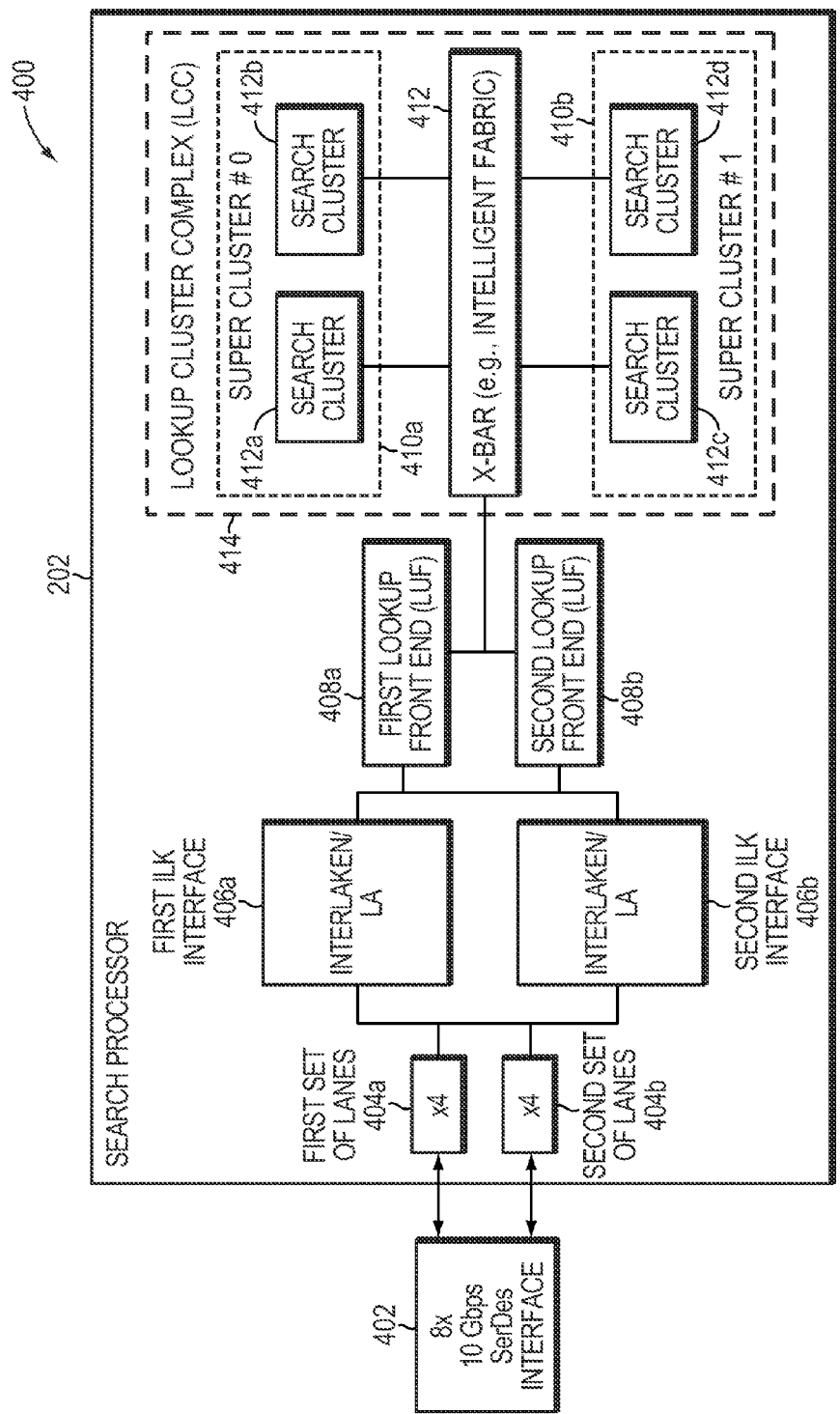
FIGS. 4A-B are block diagrams of example embodiments of a search processor.

FIG. 4A is a block diagram 400 of an example embodiment of the search processor 202. The search processor 202 is coupled with a serializer/deserializer (SerDes) interface 402. In one embodiment, the SerDes interface 402 includes eight transport lanes capable of data transfer speeds of up to at least 10 Gb per second. The search processor 202 includes two sets of quad lane interfaces 404a-b coupled with the SerDes interface 402. Each of the quad lanes interfaces 404a-b are coupled with a first Interlaken interface 406a and a second Interlaken interface 406b. The Interlaken interfaces 406a-b are then coupled with a first lookup front end (LUF) 408a and a second look up front end (LUF) 408b. The LUFs 408a-b are coupled with a crossbar 412 (also described as an intelligent fabric or 'X-bar').

The crossbar 412 is coupled with a first supercluster 410a and a second supercluster 410b. Within each supercluster 410a-b are a plurality of search blocks 412a-d. Each search block 412a-d, or search cluster, is configured to receive a key from a received packet, determine and load a set of rules to process the key, and output results of the search executed using those rules. The crossbar 412 and the superclusters 410a-b are part of a lookup cluster complex (LCC) 414.

Figure 4B:
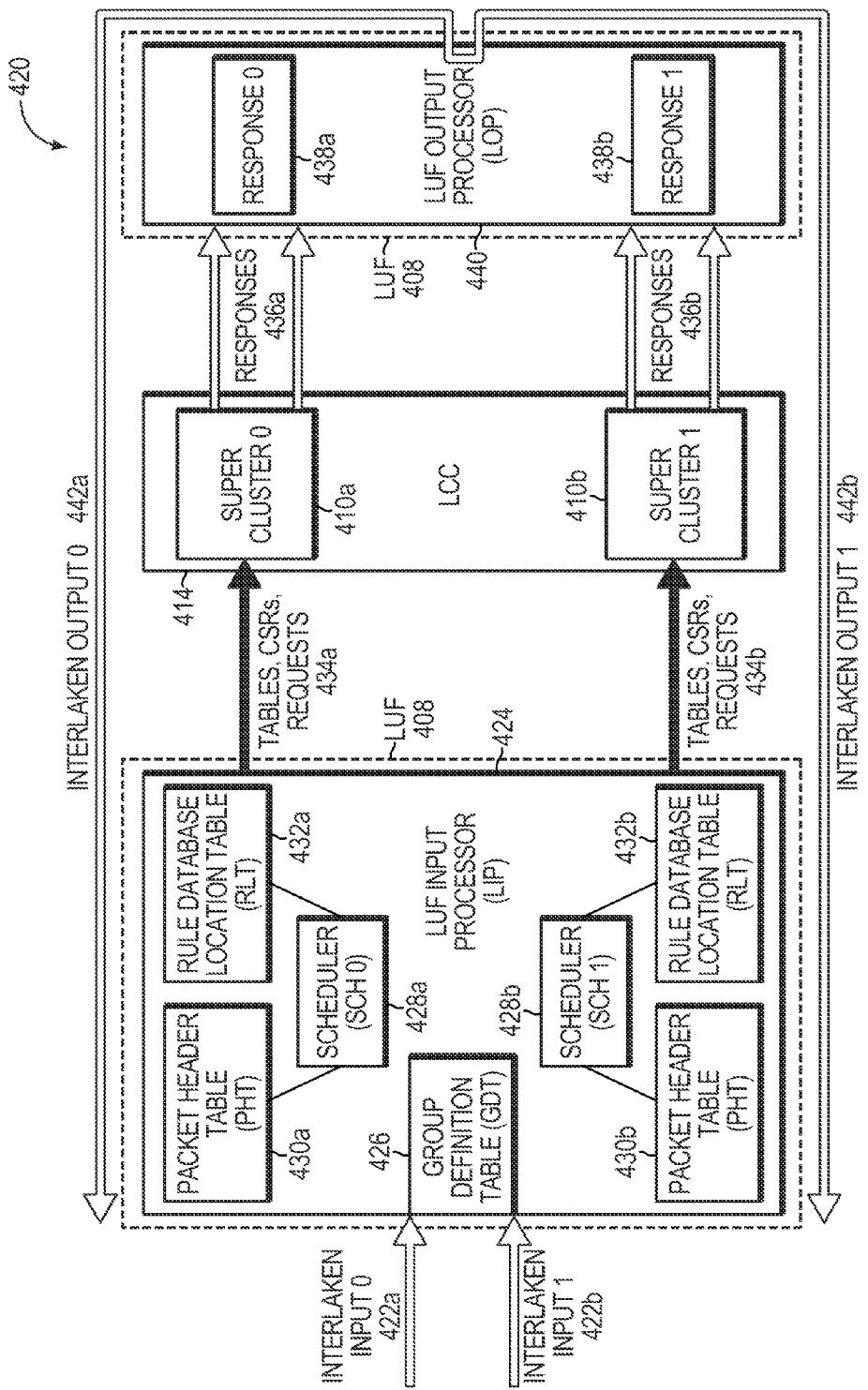

FIG. 4B is a block diagram 420 of an example embodiment of the search processor described herein. The search processor includes the LUF 408 as shown as being a LUF input processor (LIP) 424 and a LUF output processor (LOP) 440. The processor further includes the LCC 414, which includes superclusters 410a-b. The LIP 424 receives an Interlaken input 422a and Interlaken input 422b. The LIP 424 includes a scheduler 428a-b, packet header tables 430a-b, rule database location table 432a-b and a group definition table 426. The LIP 424 generates tables, CSRs, and requests 434a-b to the LCC 414. The LCC 414, based on the superclusters 410a-b and the search clusters (not shown) therein, generate responses 436a-b. The LOP 440 then receives the responses and outputs them over Interlaken output 442a and Interlaken output 442b.

The processor described herein loads one or more rules (e.g., matching rules) that match a packet. In general, a packet may be broken down into parts, such as a header, a payload, and a trailer. The header of the packet (or packet header) may be further broken down into fields, for example. So, the processor may further find one or more rules that match one or more parts (or fields) of the packet.

The processor can execute a "lookup request," which finds one or more rules matching a packet or parts of a packet. The lookup request first leads to finding one or more matching rules.

From the standpoint of the processor described herein, executing a lookup request begins with 1) receiving the lookup request from a host processor. The lookup request includes a packet header and group identifier (GID).

2) The GID indexes to an entry in a global definition/description table (GDT). Each GDT entry includes (a) n number of table identifiers (TID), (b) a packet header index (PHIDX), and (c) key format table index (KFTIDX).

3) Each TID indexes an entry in a tree location table (TLT). Each TLT entry identifies which lookup engine or processor core looks for the one or more matching rules. In this way, each TID specifies both which lookup engine or processor core looks for the one or more matching rules and where the particular one or more matching rules are stored.

4) Each TID also indexes an entry in a tree access table (TAT). Each TAT entry provides the starting address (e.g., a root node) in memory of a collection of rules (or pointers to rules) called a table or tree of rules. The terms table of rules, tree of rules, table, or tree are used interchangeably throughout the Application. In all, the TID identifies the TAT, which identifies the collection or set of rules in which to look for one or more matching rules.

5) The PHIDX of the GDT entry indexes an entry in a packet header table (PHT). Each entry in the PHT instructs the processor how to extract n number of keys from the packet header.

6) The KFTIDX of the GDT entry indexes an entry in a key format table (KFT). Each entry in the KFT provides instructions for extracting one or more fields (i.e., parts of the packet header) from each of the n number of keys extracted from the packet header.

7) The processor looks for subsets of the rules using each of the fields extracted from the packet together with each of the TIDs. Each subset contains rules that may possibly match each of the extracted fields.

8) The processor then compares each rule of each subset against an extracted field. The processor provides rules that mach in responses or lookup responses.

The above description of a lookup request and its enumerated stages are described to present concepts of lookup requests. These concepts may be implemented in numerous ways. For example, according to example embodiments of the present invention, these concepts may be implemented by a search processor.

As described above, the search processor processes a lookup request for a packet. In processing the lookup request, the processor can extract a header or field from the packet that is then applied to one or more rules. The header of field can be referred to as a key.

The search processor stores at least one tree of rules. In one embodiment, the tree of rules is a memory structure employed by the processor to narrow down a set of rules for a given key and a rule is a test of a value of a key. The tree has a root node, or a starting address. The search processor uses a tree walk engine (TWE) to traverse the tree for a particular key. The TWE eventually reaches a pointer to a memory address in the tree. The pointer can be either to a bucket of rules or a pointer to rules in memory directly.

A bucket of rules is a set of pointers to rules. If the pointer is to a bucket of rules, a bucket walk engine (BWE) determines, based on the key and the bucket, a pointer to rules in a memory, such as an on chip memory. A group of rules in memory is called a chunk. The chunk can be sequentially addressed rules or rules grouped in another manner. If the pointer is to rules in the memory directly, the pointer may point directly to the chunk.

Once the processor loads the chunk of rules from memory, it sends the key and the chunk of rules to a rule match engine (RME). The rule match engine determines whether the key matches rules within the chunk. Then, the RME and the search processor can respond to the lookup request with the selected rule and match result.

Figure 4C:
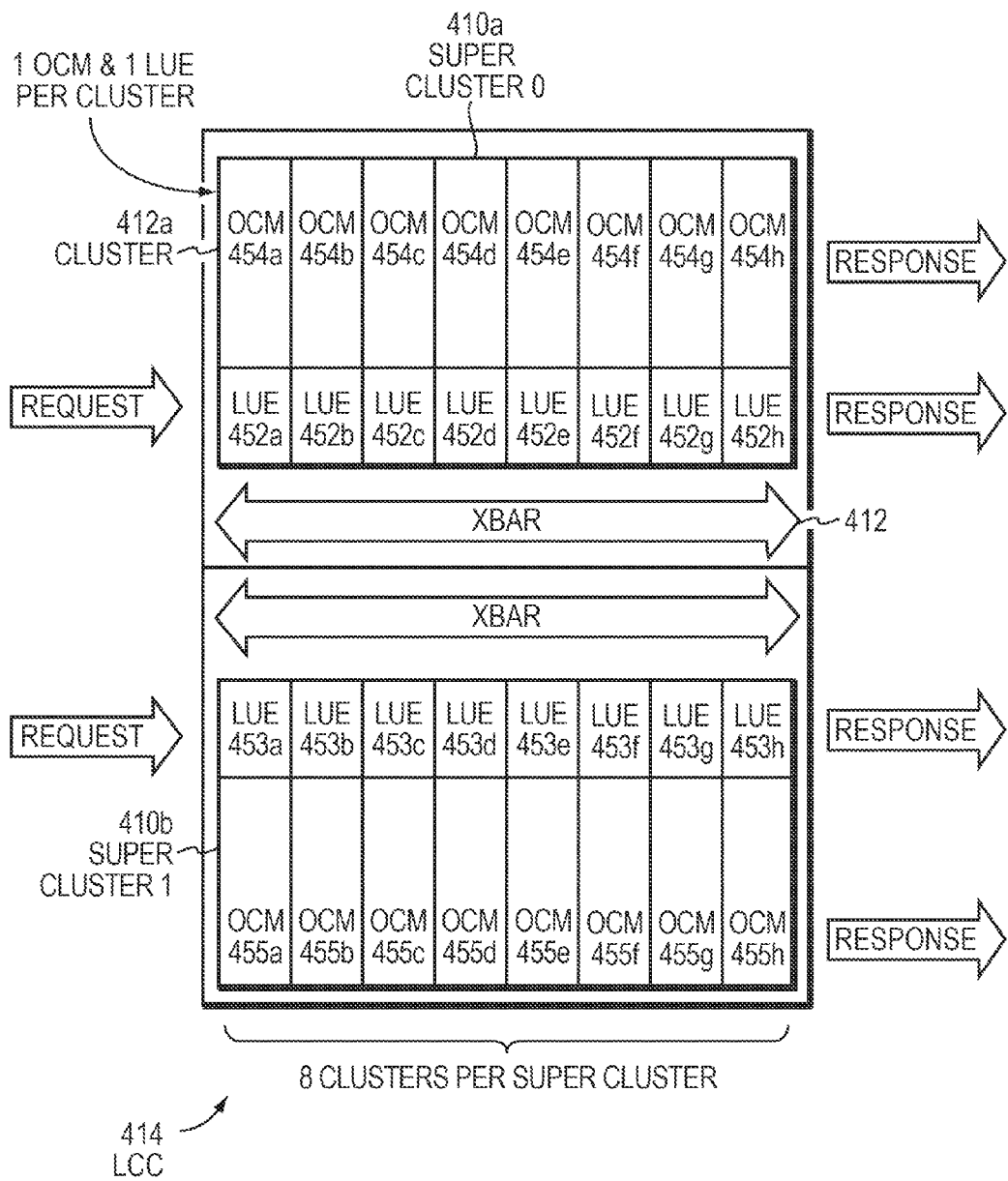
FIG. 4C is a block diagram of a Lookup Cluster Complex (LCC) in one embodiment.

FIG. 4C is a block diagram of a Lookup Cluster Complex (LCC) 414 comprising two super clusters 410*a-b* in further detail. Each super cluster includes multiple (e.g., eight) clusters, and each cluster (e.g., cluster 412*a*) comprises a LUE 452*a-h*, 453*a-h* and an associated on-chip memory 454*a-h*, 455*a-h*, together with a cross bar device 412. An example search processor may have more than one of such super clusters 410*a-b* for processing packet data.

Figure 4D:
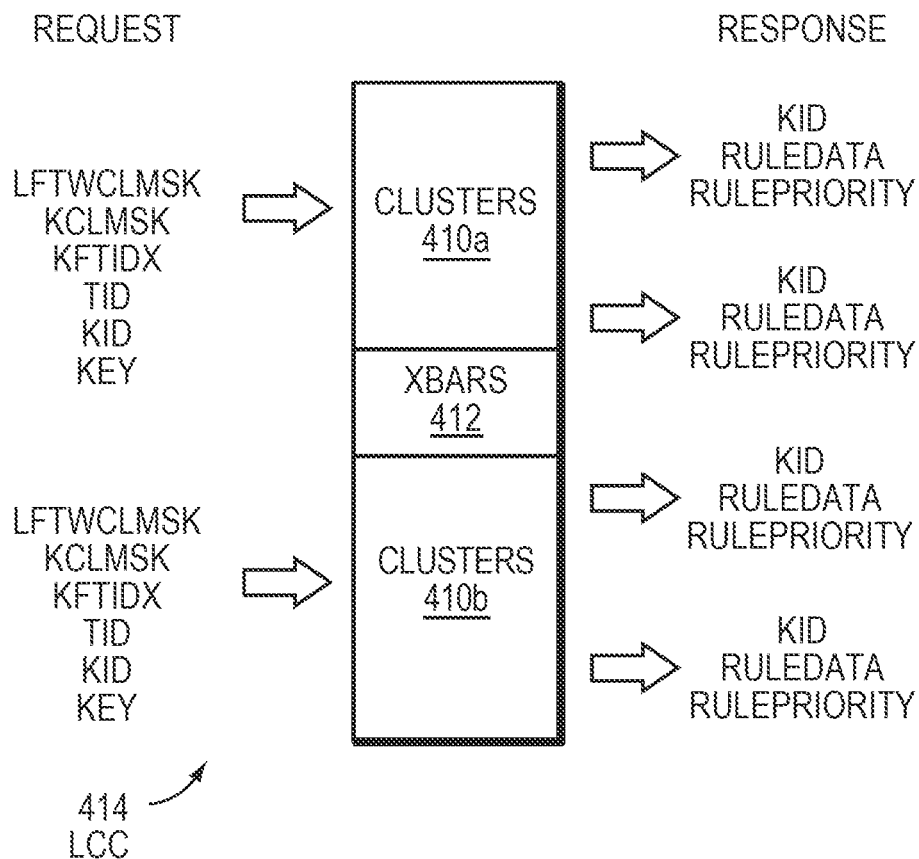
FIG. 4D is a block diagram illustrating input and output data at a LCC in one embodiment.

FIG. 4D is a block diagram illustrating input and output data at a LCC 414 in one embodiment. The LCC 414 may be configured to receive, in a lookup request or other communication, the following information:
1) Least Full Cluster Mask (LFTWCLMSK) is the bit mask used to select which clusters to enable per Super Cluster for a given search.
2) Key Cluster Mask (KCLMSK) indicates which clusters within the LCC must accept key request data. The KCLMSK allows clusters, which may not be involved at the beginning of the search, to perform the final portions of processing. The Xbar segments within the Super Clusters allow searches to migrate from one cluster to another. The KCLMSK informs all the clusters that may potentially be involved.
3) Tree ID (TID) & Key Format Index (KFTIDX) together with the masks select tree roots where execution (walking a tree or RCDS representing a set of rules) begins.
4) Key ID (KID) is maintained such that the LUF may track in-flight inventory and match returns to requests.
5) KEY is the data extracted from the header tuples to search the trees or RCDS for.

The search processor provides a method to launch from 1 to 4 searches off of a single packet header. Each of these requests may search completely different and completely independent field sets within the headers. The searches are in every way independent searches with the caveat that they are related to the same packet header. The search fabric (LCC) treats them as completely different searches and has no knowledge (other than passing sub-key IDs in and out) of the initial request expansion.

Further, the LCC 414 may be configured to output, in a response to a lookup request or other communication, the following information:
1) KID is the returned Key ID.
2) RuleData is part of the response back to the host.
3) RulePriority is a metric associated with a sub-tree (or sub-RCDS) response allowing the LUF to select the single best response from multiple cluster returns. MinRule is also part of the response back to the host.

Multiple response messages corresponding to a common packet, when passed back to the host, may share a common ID and are coalesced to produce the multiple responses per clock to achieve the desired throughput. The responses need not be coalesced but more efficient use of interface bandwidth is attained if the responses are coalesced. In an example embodiment, between one and four responses may be coalesced into a response message, matching the number of requests in the originating search request.

Figure 5:
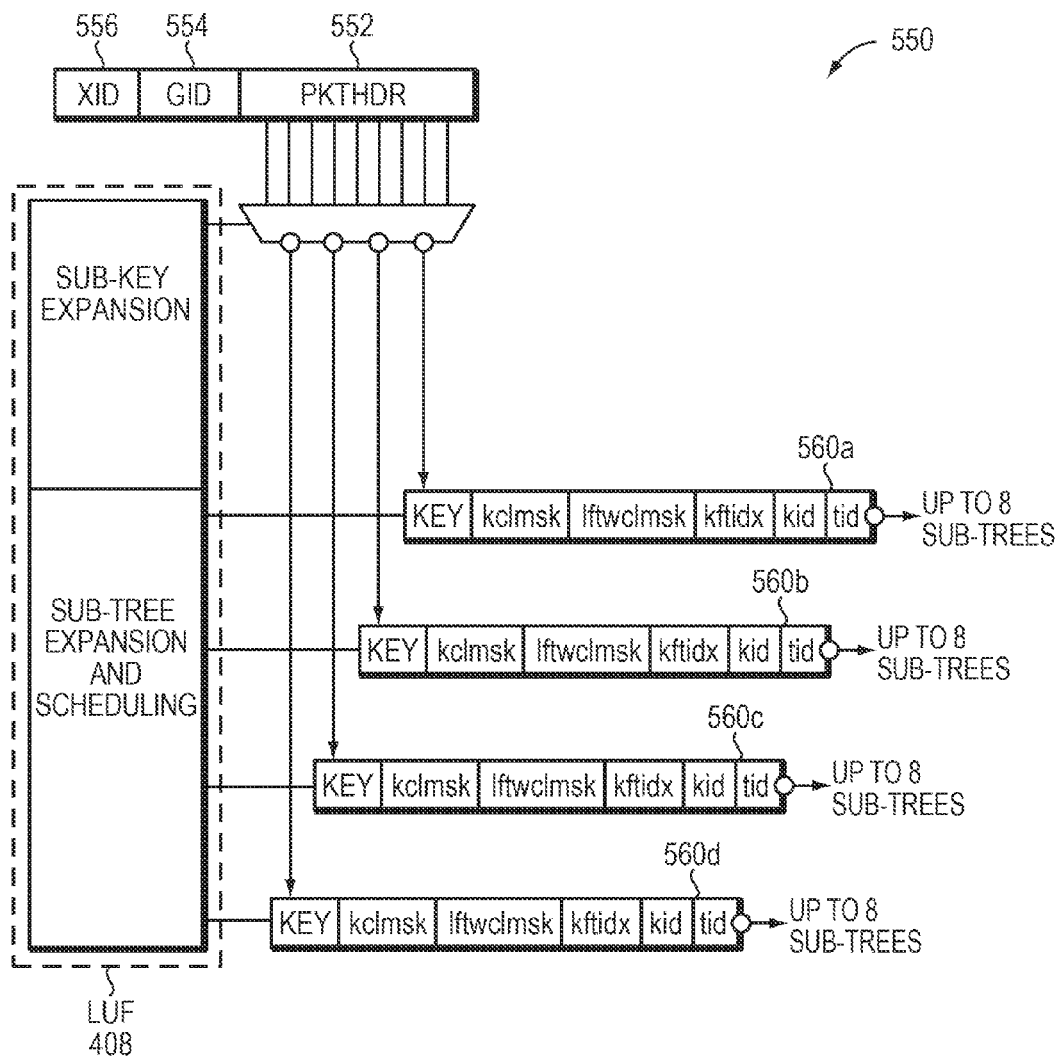
FIG. 5 is a block diagram illustrating generation of multiple lookup requests from a single packet header.

FIG. 5 is a block diagram illustrating generation of multiple key requests from a single lookup request 550. A lookup request 550, including packet header 552, arrives at a LUF 408 across the command interface. The Group ID (GID) 554 field indexes various internal LUF 408 tables and allows the LUF 408 to generate up to 4 different key requests 560*a-d* having distinct keys (also referred to as "sub-keys"), which can be used to initiate four independent searches. In an example embodiment, a key of a key request 560*a* can be up to 476 bits wide, while the packet header 552 can be up to 512 bits wide. The keys can be reconstructed on a nibble granularity basis, and can be completely reordered by the customer application layer. In an example embodiment, the search processor can pre-store up to 16 ways of key reconstruction.

A sub-key expansion index module of the LUF 408 determines how the packet header 552 is to be divided into a plurality of sub-keys for the respective key requests 560*a-d*. After expanding the packet header 552 into a plurality of sub-keys, a subtree expansion and scheduling module of the LUF 408 directs each of the key requests 560*a-d* to an appropriate part of the search processor.

Downstream of the sub-key expansion, the LUF 408 schedulers choose the clusters to perform multiple sub-RCDS walks per sub-key, for example. Each of the sub-keys is considered an individual search sharing a common XID 556 eventually returned to the host but not used internally. Thus, the LUF 408 expands and tracks 4 sub-keys relative to a single request.

Figure 6:
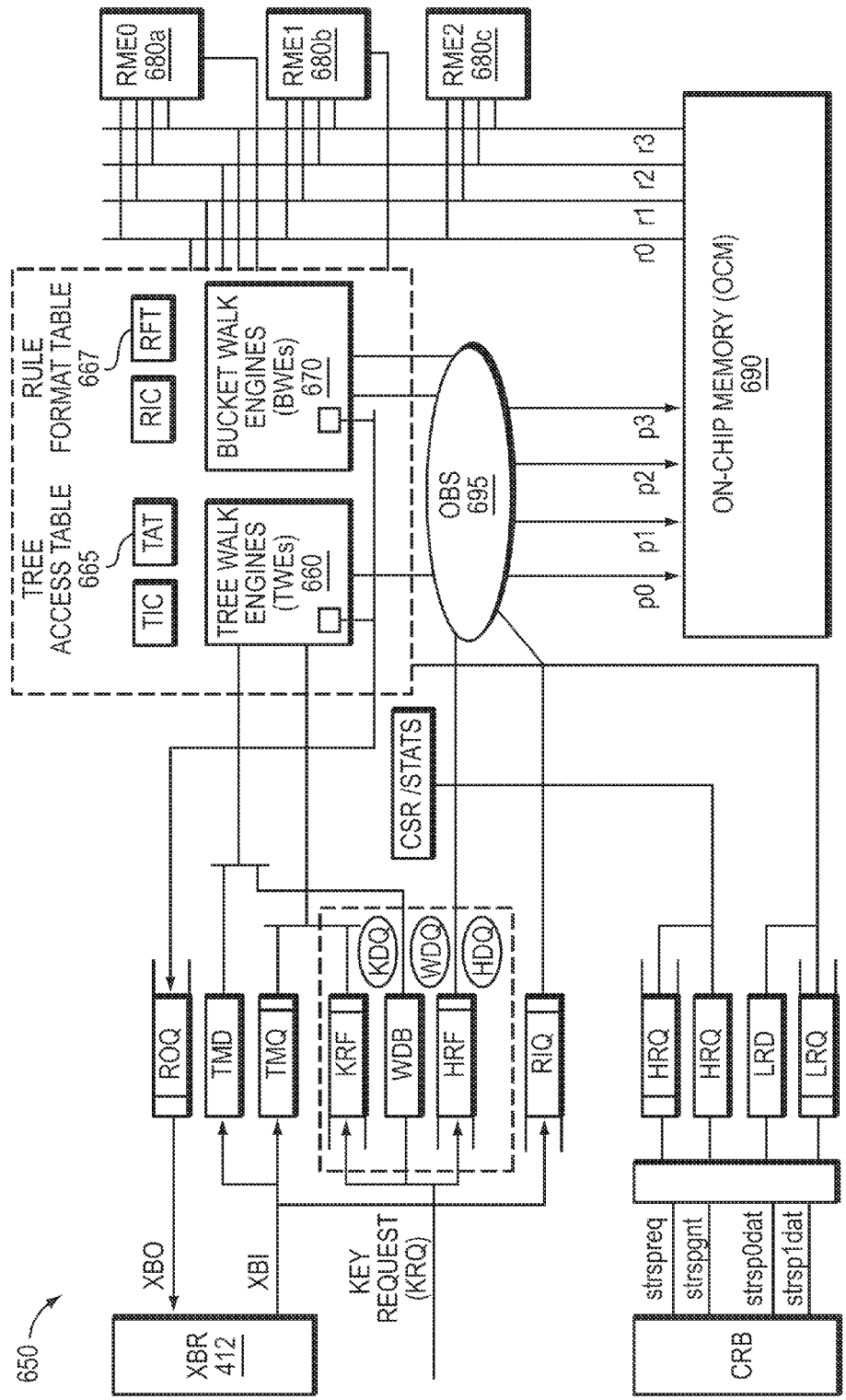
FIG. 6 is a block diagram of a Lookup Engine (LUE) and associated on-chip memory (OCM) in one embodiment.

FIG. 6 is a block diagram of a Lookup Engine (LUE) 650 and associated on-chip memory (OCM) 690 in one embodiment. The LUE 650 may be implemented in the search processor and LCC configurations described above with reference to FIGS. 4A-D. According to one embodiment, for rule processing, the LUE 650 includes a complex of one or more tree walk engines (TWEs) 660, a complex of one or more bucket walk engines (BWEs) 670, and rule match engines (RMEs) 680*a-c*. In another embodiment in which rule processing is extended to external memory (described below), the LUE 650 may also include a bucket post-processor (BPP) having an additional RME. The OCM 690 associated with the LUE 650 stores rules for rule-matching by the LUE 650.

In an operation of an example search processor, a host interface (FIG. 4A) receives a lookup request from the host. The LUF (e.g., LUF 408*a* in FIG. 4A) processes the lookup request into one or more key requests, each of which has a key (FIG. 5). The LUF schedules the requests to the super cluster, selecting a set of clusters to process the lookup request.

Turning to FIG. 6, the LUE 650 component of the selected cluster processes the lookup request. Here, the TWE 660 uses the key (included in the key request) to walk a tree representing a set of rules that may match the key. When the TWE 660 reaches a leaf in the tree, the TWE 660 passes a subset of the rules, called a bucket of rules (or bucket), to the BWE 670. The terms tree and Rule Compiled Data Structure (RCDS) are used interchangeably, herein. The BWE 670 processes the bucket of rules and then engages the RME 680*a-c*. The RME 680*a-c* compares the key to rules, which were identified by the TWE 660. The search processor provides "match found" or "no-match found" as a response to the host.

Prior to receipt of the lookup request to the LUE 650, a LUF (e.g., LUF 408*a* in FIG. 4A) receives the lookup request from a host processor. The lookup request includes a packet header and group identifier (GID). The GID indexes to an entry in a global definition/description table (GDT). Each GDT entry includes (a) n number of table identifiers (TID), (b) a packet header index (PHIDX), and (c) key format table index (KFTIDX). Each TID, in turn, indexes an entry in a tree location table (TLT). Each TLT entry identifies which lookup engine or processor core looks for the one or more matching rules. In this way, each TID specifies both which lookup engine or processor core looks for the one or more matching rules and where the particular one or more matching rules are stored.

Each TID also indexes an entry in a tree access table (TAT) 665 at the LUE 650. Because there may be more than one collection or set of rules on the LUE (e.g., stored in memory), the TID identifies which one of them in which to look for one or more matching rules. Each TAT 665 entry provides the starting address (e.g., a root node) in memory of a collection of rules (or pointers to rules) called a table or tree of rules. (The terms table of rules, tree of rules, table, or tree are used interchangeably throughout the Application.) Thus, the TID identifies the TAT 665, which identifies the collection or set of rules in which to look for one or more matching rules.

The PHIDX of the GDT entry indexes an entry in a packet header table (PHT). Each entry in the PHT instructs the processor how to extract n number of keys from the packet header. The KFTIDX of the GDT entry indexes an entry in a key format table (KFT). Each entry in the KFT provides instructions for extracting one or more fields (i.e., parts of the packet header) from each of the n number of keys extracted from the packet header. For example, a KFT entry (or key format type) specifies which bits out of a 100-bit key correspond to a source IP address of an IP packet header.

The LUF assembles one or more key request from the lookup request, as shown for example in FIG. 5, and forwards a key request to the LUE 650.

In operation, the LUE 650 receives the key request (KRQ) from the (LUF) (such as the LUF 408*a* of FIG. 4A). The KRQ includes a key (KEYDATA), key format table index (KFTIDX), and table identifier (TID), and may include additional data associated with the lookup as shown by the key requests 560*a-d* described above with reference to FIG. 5.

The key is parsed according to the instructions provided from the KFT (and indexed by the KFTIDX). The TWE 660 then uses the parsed key to walk a tree representing a set of rules that may match the parsed key. The tree walked by the TWE 660 includes nodes and leaves. The TWE 660 starts the walk at a root node of the tree. The location of the root node is provided from the TAT 665 (and indexed by the TID). The TWE 660 walks the tree until it reaches a leaf. Each leaf in the tree represents a subset of the rules, called a bucket of rules (or simply bucket). When the TWE 660 reaches a leaf, it passes a corresponding bucket to the BWE 670 for processing.

The BWE 670 fetches the bucket, which may include one or more rules. In a convenient embodiment, the bucket includes one or more pointers (or addresses) to rules stored in memory. The rules may be stored in on-chip memory (OCM), in which case, the BWE 670 fetches the rules from the OCM and directs the rules to the RME (local RME). An OCM Bank Slotter (OBS) 695 provides scheduling for requests to the OCM 690, ensuring that associated access ports p0-p3 are occupied and shared among the multiple TWEs 660, BWEs 670 and RMEs 680*a-c*.

The rules may also be stored in memory located external to the LUE 650 (and search processor that includes the LUE). In this case, the BWE 670 fetches the rules from external memory and directs the rules to a Bucket Post Processor (and its associated RME), in the procedure called "rule extension," described below.

Returning to FIG. 6, the KFTIDX also indexes an entry in a rule format table (RFT) 667. Each entry in the RFT 667 provides instructions for parsing bits of a fetched rule to extract one or more fields from the rule. The rule is parsed according to the instructions provided from the RFT 667 (and indexed by the KFTIDX). The RME 680*a-c* then compares the parsed rule to the parsed key to a find a match. The RME provides "match found" or "no-match found" in a response, called a sub-tree response (STRSP), to the LUF.

According to one embodiment, each supercluster contains distributed on-chip memory (OCM), as well as 'm' pools of 'n' HW-assist thread engines where 'n' is determine by the latency of each thread iteration (n=10 cycles). To maximize performance at each cluster, if the minimum thread iteration latency='n' cycles and if each HW thread requires a single cycle OCM access, then 'n' thread engines can time division multiplex (TDM) the use of the single ported SRAM to allow fully pipelined OCM accesses every cycle, for example.

In an example embodiment, each cluster's LUE may contain 10 Tree Walk Engines (TWEs), 10 Bucket Walk Engines (BWEs) and 3 Rule Match Engines (RMEs), which are used to process incoming Host Lookup/Key Requests. Each TWE/BWE/RME engine contains its own HW context state (or HW thread), which keeps track of the state of each Key request as it is processed. At each cluster's LUE, the TWE minimum thread iteration latency of 10 cycles, allows up to 10 active TWE threads to TDM (time division multiplex) the OCM single-ported SRAM, without interference (i.e., OCM is fully-pipelined-access every cycle).

With reference to FIG. 6, in a more detailed example operation of the LUE 650, new host requests and key requests are received from the LUF over the key request bust (KRQ). Each LUE 650 may be configured to receive up to 16 outstanding KRQ requests (either key or host requests). Host requests (host R/W access for CSR/Table/OCM) enter the host request (HRF) FIFO and host write data is written into the common write data buffer (WDB). Host requests (R/W) may be processed "in order" for each LUE 650 cluster. Host responses are returned to the HRQ/HRD FIFOs where they await transfer over the STRSP bus via the central resource block (CRB) and eventually are returned to the host over Interlaken packets.

New key requests enter the key request FIFO (KRF) and their associated key data is written into the common write data buffer (WDB). Migrated tree walk requests (TWMIGs) are transferred from the source LUE 650 cluster to the destination LUE cluster via the XBR 412 bus. New TWMIGs are enqueued to the TMQ/TMD and await pending TWEs 660 for processing.

New key requests (KRF) and migrated tree requests (TMQ) arbitrate for the TIC/TAT 665 access using the tree ID (TID). The TIC/TAT 665 structure contains tree access table information used during a sub-tree walk to an assigned one of the TWEs 660. For new key requests, the RIC/RFT 667 is also accessed to get rule format table information loaded by software. A Tree Migration request may not re-fetch the RIC/RFT table, but instead may carry RIC/RFT info in the migration request itself from the source cluster. Also, the key data for a tree migration request may be stored in the Tree Migration Data (TMD).

Once TAT 665 and/or RFT 667 info is fetched, a new key request is assigned to one (of n) TWEs 660. To expedite a new key request search (implementing HW parallelism), the key request can be partitioned (by software operation) into up to eight unique sub-tree walks, where each sub-tree walk thread is assigned to a separate one of the TWEs 660. A TW migration request may always be assigned to just a single TWE.

Once a TWE's sub-tree walk has detected a leaf node, control for processing is transferred to the pool of bucket walk engines BWEs 670. BWEs 670 use the bucket info descriptor from the leaf node to fetch bucket entries. Bucket entries (BEs) are then processed by rule match engines (RMEs) 680a-c. The RMEs 680a-c process the Bucket Entries (BEs), which contain pointers to rule chunks (RulChkPtr). The RMEs 680a-c fetch rule data and deliver to the pending pool of RMEs 680a-c. The RMEs 680a-c will use the fetched OCM Rule chunk data along with the corresponding rule format data (from the RFT 667), to process the chunk of rules specified by each bucket entry (BE). The RMEs 680a-c will aggregate partial RME match results for each rule chunk for all Bucket entries (BE) within the entire bucket. Once a match/nomatch result is acquired, the lookup response (LURSP) is driven back to the LRQ/LRD, which are driven back to the lookup front-end (LUF) via the STRSP bus.

At any time during a rule-matching operation, a BWE 670 may make a remote Bucket Entry (BE) request, or an RME 680a-c may make a remote rule chunk request to another cluster via the remote output queue (ROQ). The OCM Bank Select (OBS) 695 arbiter is responsible for all accesses to the common OCM, which houses all free/bucket and rule data structures. A remote cluster may access the OCM of another cluster by making a remote OCM request over the XBR 412, which is enqueued to the remote input queue (RIQ). The TWE pool, BWE pool, RIQ and HRF can all make requests into the common OCM, which has complex dynamic arbitration schemes to minimize overall OCM latency and to maximize OCM bandwidth (bank conflict avoidance) for optimal overall search performance.

As described above, the rules may reside on the on-chip memory (OCM). In such a case, the RME 680a-c engaged by the BWE 670 is part of the same LUE 650 as the BWE 670. As such, it can be said that the BWE 670 engages a "local" RME 680a-c. The rules may also reside on memory located external to the processor, i.e., off-chip. In such a case, which may be referred to as rule processing extended to external memory, or "rule extension," the BWE 670 does not engage its local RME 680a-c. Instead, the BWE 670 sends a request message to a memory controller to read a portion of the bucket of rules, called a "chunk." The BWE 670 also sends a "sideband" message to the BPP informing the BPP to expect the chunk (associated with a given key) to come from external memory.

The BPP starts processing the chunk of rules received from the external memory. As part of the processing, if the BPP finds a match, the BPP sends a response, called a lookup response (also called a sub-tree response) to the LUF. The BPP also sends a message to the LUE informing the LUE that the BPP is done processing the chunk and the LUE is now free to move on to another request.

If the BPP does not find a match and the BPP is done processing the chunk, the BPP sends a message to the LUE informing the LUE that the BPP is done processing and to send the BPP more chunks to process. The LUE then sends a "sideband" message, through the MWA and MBC, to send a next chunk of the bucket of rules to the BPP, and so on.

For the last chunk of the bucket of rules, the LUE 650 sends a "sideband" message to the BPP informing the BPP that the chunk, which is to be processed by the BPP, is the last chunk. The LUE knows that the chunk is the last chunk because the LUE knows the size of the whole bucket. Given the last chunk, if the BPP does not find a match, the BPP sends a "no-match" response to the LUF informing the LUF that the BPP is done with that bucket. In turn, the LUE 650 frees up the context (i.e., details of the work done) and moves on to another request.

In further embodiments, multiple clusters may be configured to contain identical Rule Compiled Data Structure (RCDS) or sub-RCDS. In such a configuration, the LUF may load balance the work by choosing the least busy cluster to perform the search.

Figure 7:
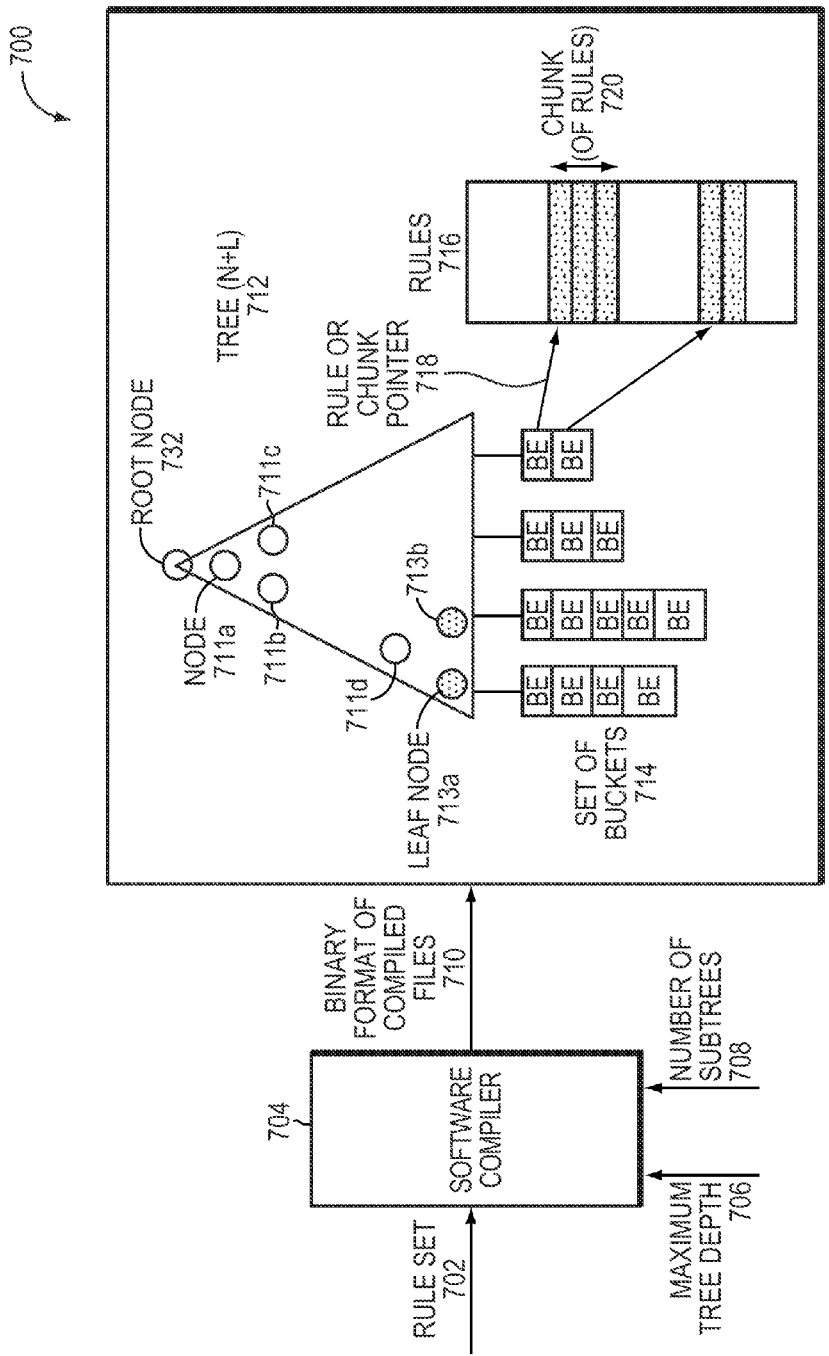
FIG. 7 is a block diagram illustrating an example embodiment of a compiler loading rules into a memory structure.

FIG. 7 is a block diagram 700 illustrating an example embodiment of a compiler loading rules into a memory structure. A software compiler 704 receives a rule set 702. The software compiler 704 generates a binary format of compiled rules 710. The binary format of compiled rules 710 includes a tree 712, buckets 714 and rules 716. The tree 712 includes nodes 711a-d, leaf nodes 713a-b, and a root node 732. Each leaf node 713a-b of the tree 712 points to one of a set of buckets 714. Within each bucket are bucket entries which contain rule or chunk pointers 718. The rules 716 include chunks of rules 720. A chunk 720 (of rules) can be a sequential group of rules, or a group of rules scattered throughout the memory, either organized by a plurality of pointers or by recollecting the scattered chunk 720 (e.g., using a hash function).

Figure 8:
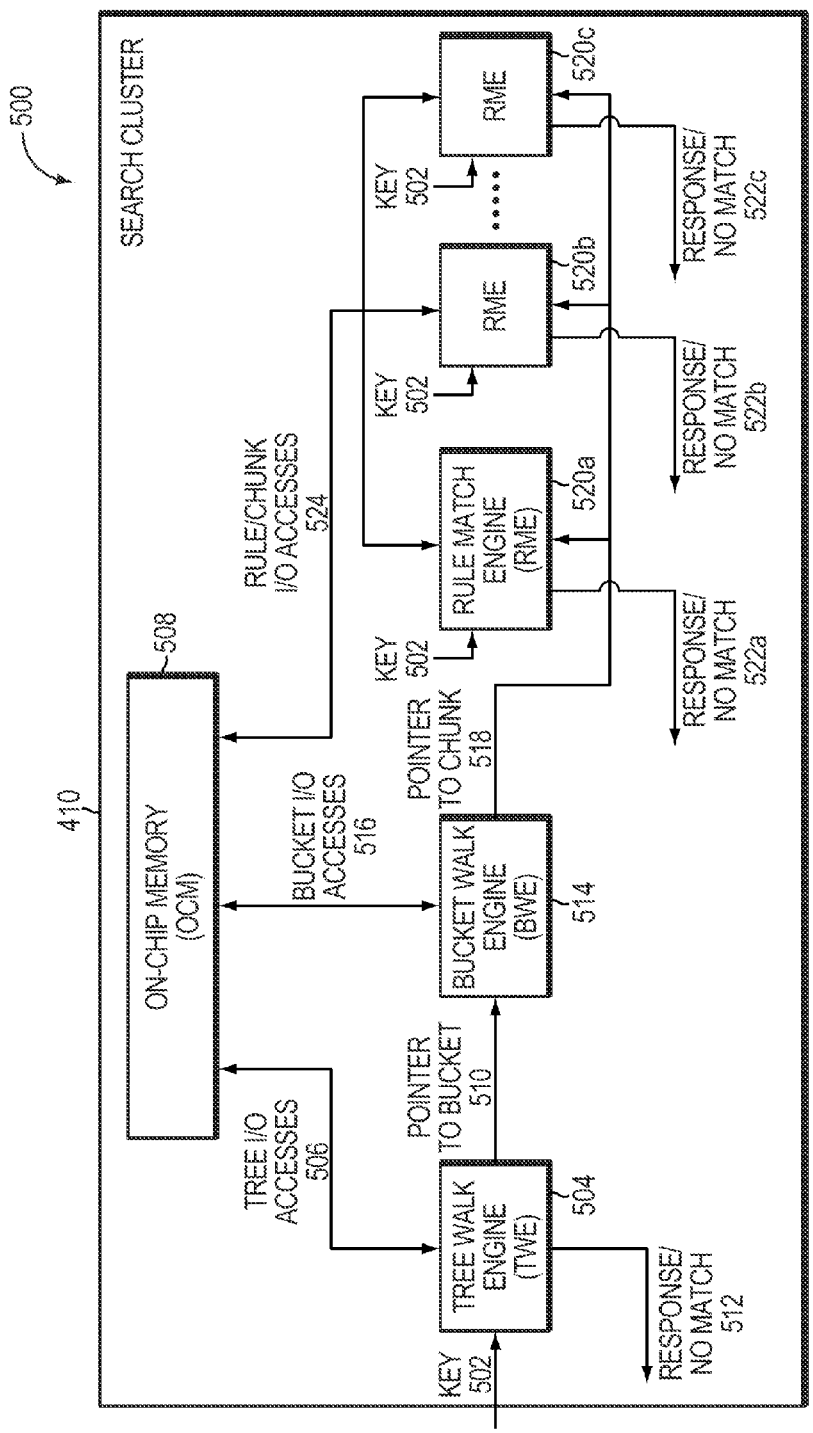
FIG. 8 is a block diagram illustrating an example embodiment of a search block or search cluster.

FIG. 8 is a block diagram 500 illustrating an example embodiment of a search block or search cluster 410. The search cluster 410 includes an on-chip memory (OCM) 508, a tree walk engine (TWE) 504, a bucket walk engine (BWE) 514 and a plurality of rule match engines (RME) 520a-c. The OCM 508 stores a tree data structure, a bucket storage data structure, and a chunk and/or rule data structure.

The search cluster 410 receives a key 502 from the LUF 408 (FIG. 4A) at the TWE 504. The TWE 504 issues and receives a plurality of tree input/output (I/O) accesses 506 to the OCM 508. Based on the key 502, the TWE 504 walks the tree from a root node to a possible leaf node. If the TWE 504 does not find an appropriate leaf node, the TWE 504 issues a nomatch 512 (e.g., a no match). Then, if the TWE 504 finds an appropriate leaf node, the leaf node can indicate a pointer 510 to a bucket. The TWE 504 provides the pointer 510 to the bucket to the BWE 514. The BWE 514 accesses the OCM 508 by issuing bucket I/O accesses 516 to the OCM 508. The bucket I/O accesses 516 retrieve at least one pointer 518 to a chunk to the BWE 514. The BWE 514 provides the pointer 518 to the chunk to one of the plurality of RMEs 520a-c. The one of the chosen RMEs 520a-c also receives the key 502. Each of the plurality of RMEs 520a-c are configured to issue rule and/or chunk I/O accesses 524 to the OCM 508 using the pointer 518 to the chunk to download appropriate rules from the chunk in the OCM to analyze the key 502. The RMEs 520a-c then analyze the key using the rules accessed from the OCM 508 and issue a response or nomatch 522a-c corresponding to whether the key matched the rule or chunk indicated by the tree and bucket stored in the OCM 508.

Figure 9A:
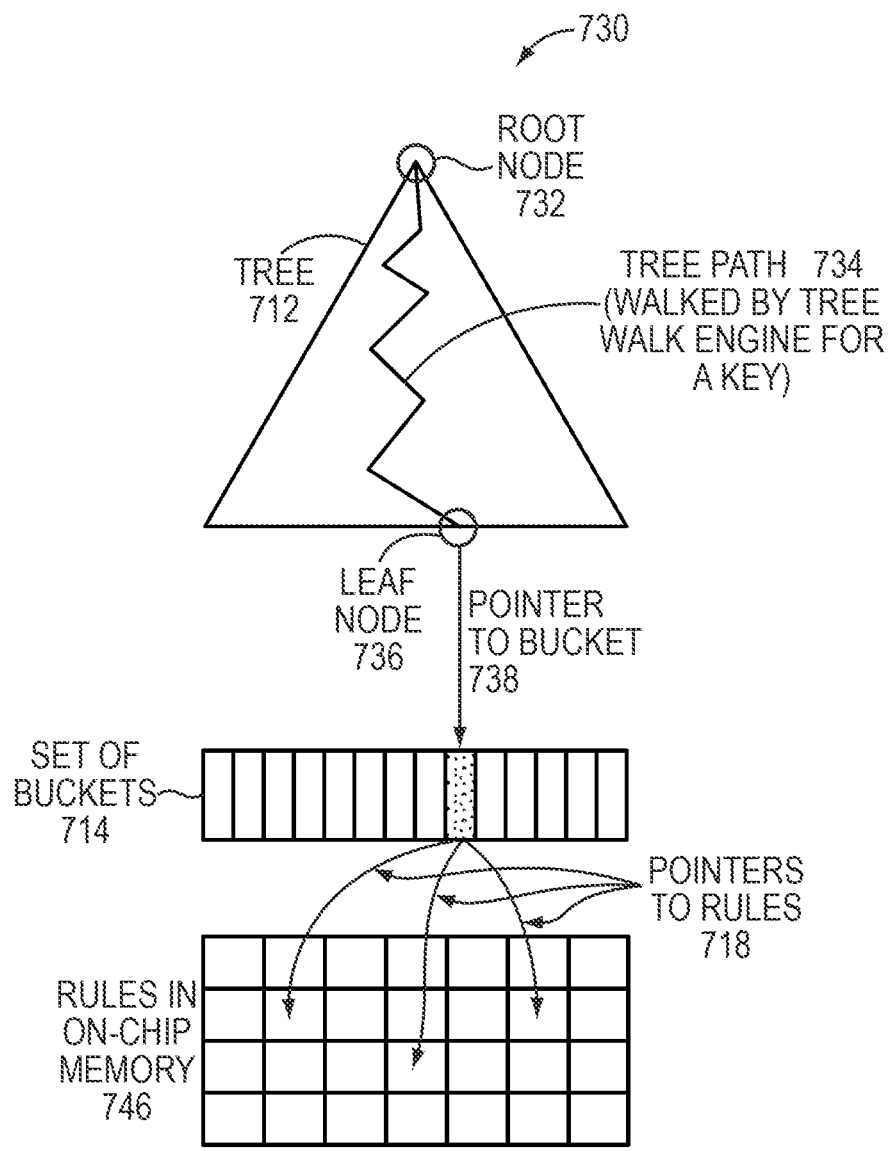
FIG. 9A is a block diagram illustrating an example embodiment of a memory structure used to load rules for a given key in a packet.

FIG. 9A is a block diagram 730 illustrating an example embodiment of a memory structure used to load rules for a given key in a packet. The TWE (e.g., TWE 660 in FIG. 6) begins walking the tree 712 for a particular key, starting at its root node 732 and walking along a tree path 734. The TWE walks the tree path 734 through the tree 712 for each key it receives. Eventually, the tree path 734 reaches a leaf node 736 which either contains null or nomatch, in which case the TWE returns a nomatch, or contains a pointer to a bucket 738. In this case, the TWE sends the pointer to the bucket 738 to a BWE, which loads the particular bucket out of the set of buckets 714. The particular bucket can contain at least one pointer 718 to rules or chunks of rules. The BWE loads rules based on the pointer 718 to the rule 746 from the OCM to one of the RMEs in the search cluster.

Figure 9B:
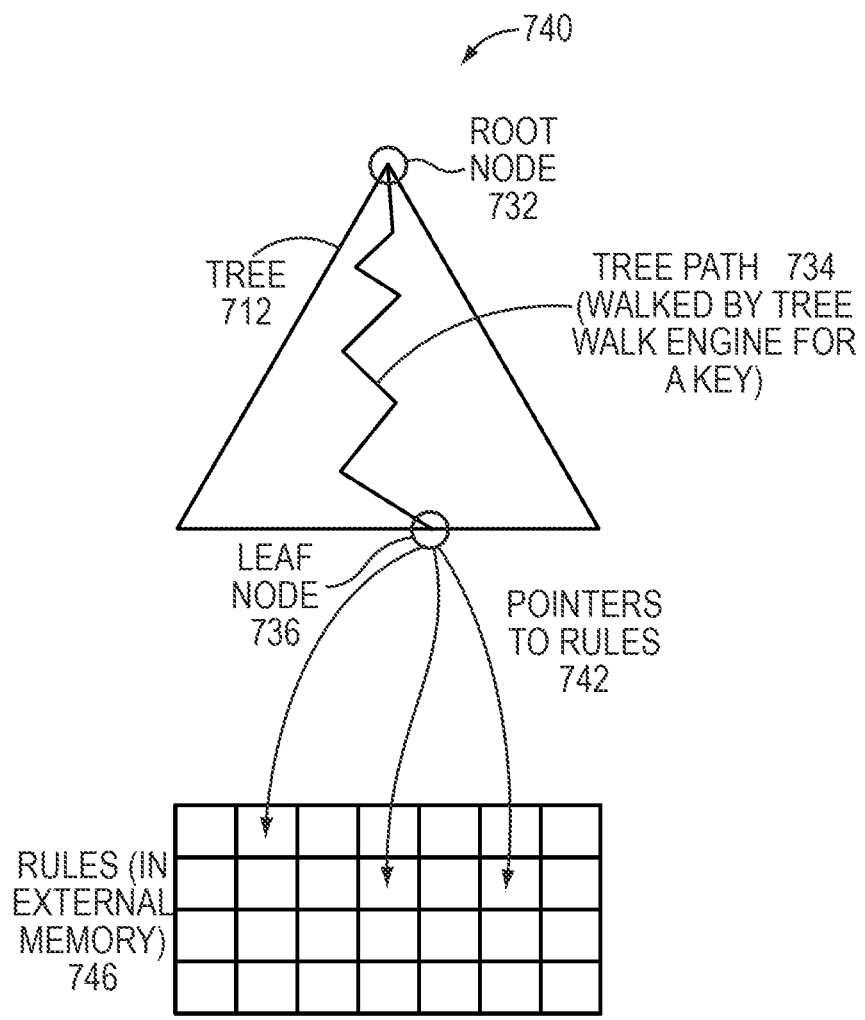
FIG. 9B is a diagram illustrating an example embodiment of a memory structure employed by a TWE that receives a key and loads a set of rules from the memory structure, where the rules are stored in an external memory.

FIG. 9B is a diagram 740 illustrating an example embodiment of a memory structure employed by a TWE that receives a key and loads a set of rules from the memory structure, where the rules are stored in an external memory, as opposed to an on-chip memory. Again, the TWE receives the key and walks the tree 712 along the tree path 734 from the root node 732 until it reaches a leaf node 736, either storing a null value, in which case the TWE returns a nomatch, or storing pointers 742 to rules. In the external memory embodiment, the leaf node 736 points directly to the rules and/or chunks 746 in the external memory. When rules are stored in the OCM, the leaf node 736 may point to buckets, and the buckets then point to the rules and/or chunks. However, when the rules are stored in the external memory, the TWE loads the rules based on the pointer 742 to rules from the external memory and sends the rules 746 to the Bucket Post Processor (BPP). The BPP is employed to process rules from the external memory 746. The same tree structure can point to either buckets or rules in the external memory. For example, each leaf node 736 can point to an address in memory (or null). The system can determine whether the address points to the rule in the external memory or the bucket in the OCM. Based on the determination, the system accesses the appropriate memory, and the same tree can be used for both the external memory and the OCM simultaneously in one embodiment. However, the search processor can be configured to employ only the external memory embodiment or only the OCM embodiment separately.

Figure 10A:
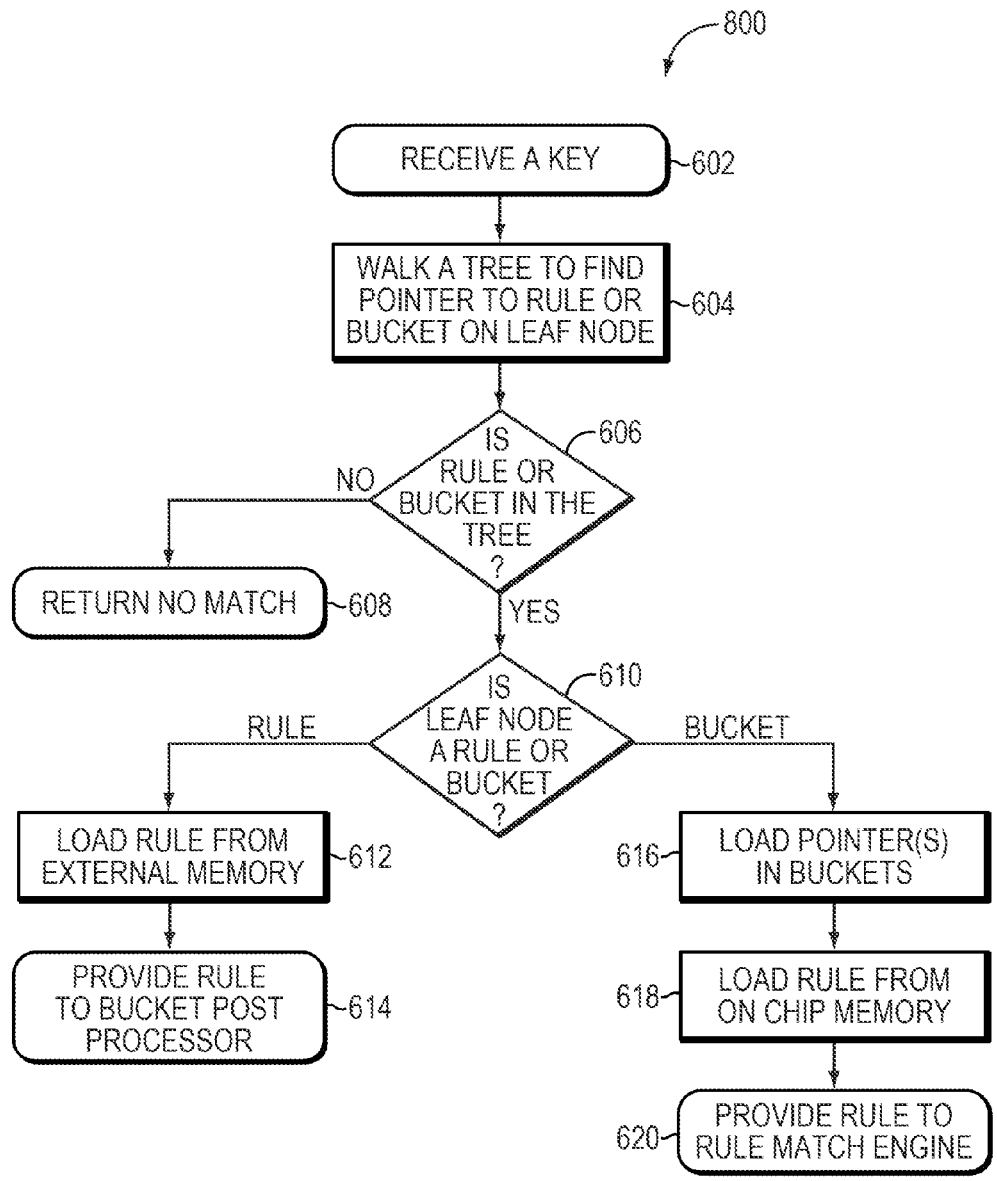
FIG. 10A is a flow diagram illustrating an example process employed by the search processor.

FIG. 10A is a flow diagram 600 illustrating an example process employed by the search processor. First, the search processor receives a key from the header area of a received packet (602). The search processor, using a TWE, then walks a tree data structure to find a pointer to a rule or a bucket on a leaf node of the tree (604). The leaf node can be nonexistent or null, which automatically causes a nomatch for the received key.

The search cluster of the search processor then determines whether the rule or bucket is in the tree (606) by searching for a non-null leaf node. If not, for instance, if the leaf node is nonexistent or null, the search cluster returns a nomatch (608). If the leaf node stores a rule or bucket, then the search cluster determines whether the leaf node points to a rule or points to a bucket (610). If the leaf node points directly to the rule, then search cluster loads the rule from an external memory (612). Then the system provides the rule to the BPP (614). The system provides the rule to the BPP by either (i) the BPP pulling the rule from the external memory using the pointer from the leaf node or (ii) a navigation unit within the search cluster sending a command to the external memory to forward the requested memory addresses to the BPP.

The BPP is a processor similar to the RME that is configured to process a chunk of rules and compare the rules to keys, however, the BPP is further configured to process rules from the external memory. Loading rules from an external memory (610, 612, 614) is an optional embodiment of the search processor and corresponding search clusters. The search processor can store all of the rules and/or chunks of rules on an OCM. Therefore, the tree data structure may store pointers to buckets instead of pointers to rules directly. Even in an embodiment where rules and/or chunks of rules are stored solely on the OCM, the leaf nodes can point directly to the rules and/or chunks of rules in the OCM without the use of buckets.

If the leaf node points to a bucket (610), then the search processor loads pointers stored in the bucket (616). Then, the search processor loads the rules that are stored in the OCM where the pointers from the bucket are pointing (618). Then, the system provides the rule(s) to RMEs (620).

Figure 10B:
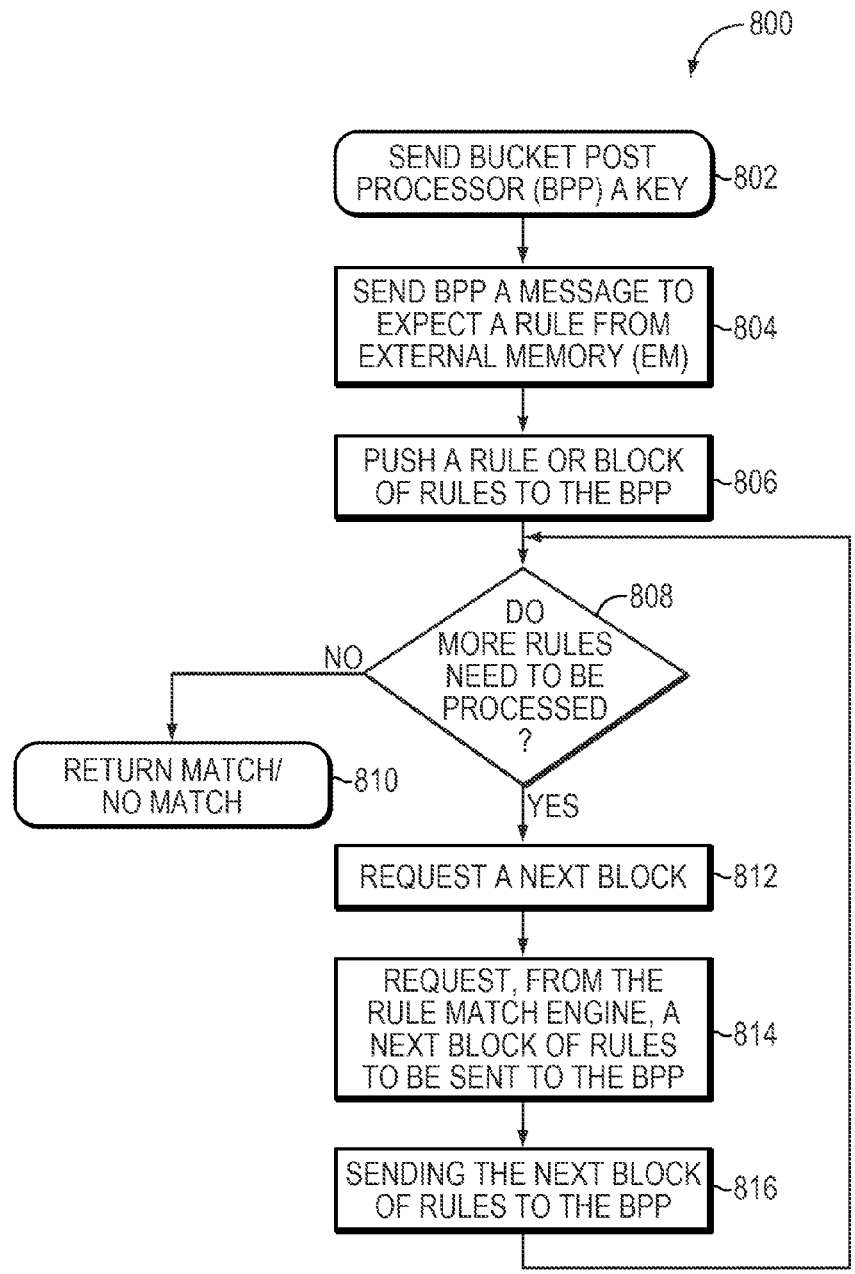
FIG. 10B is a flow diagram illustrating an example process of performing a search on a key using a set of rules by a Bucket Post Processor (BPP).

FIG. 10B is a flow diagram 800 illustrating an example process of performing a search on a key using a set of rules by the BPP. First, a packet processing engine sends a BPP a key (802). The BWE sends the BPP a message to expect to receive a rule from external memory (EM). Then the BWE pushes a rule or a block of rules to the BPP (806). Then, the BPP determines whether more rules need to be processed (808). If no additional rules need to be processed, the BPP returns a match or nomatch of the processed rules (810). If additional rules need to be processed, for instance, if only part of a chunk is processed, the BPP requests a next block of rules (812). Then, the BWE requests a next block of rules to be sent to the BPP (814). Then, the BWE sends the next block of rules to the BPP (816). The BPP determines, again, whether more rules need to be processed (808). If not, the BPP returns a match or nomatch (810). However, if more rules do need to be processed, then the BPP requests a next block of rules (812).

In an example embodiment, at each cluster, the pool of HW-assist engines are used to process key requests. A key request (or HW thread) is dispatched to one of the clusters, and assigned to a HW-assist thread engine. Each HW thread running on a unique HW-assist thread engine can make either:

a) A local OCM access to its own local OCM (for minimum latency)

b) A remote OCM access to the OCM of another cluster (within its super cluster) via the crossbar (XBR).

In some cases, a HW thread on cluster[x] may choose to remotely access OCM data on cluster[y] within the same super-cluster. This gives SW the flexibility to partition larger Rule Compiled Data Structure (RCDS) images across clusters.

c) Can migrate the HW thread (under SW control) to any other cluster (LUE) within its 8-way super-cluster.

According to an example embodiment, this HW migration technique allows a HW thread to move its thread context to a different cluster where the OCM data access is local. In other cases, a HW thread (e.g., TWE/BWE) on cluster[x] may choose to migrate its HW thread state (Tree or Bucket) to another cluster[y] within the same super-cluster, where it can access the local OCM data stored on cluster[y]. This allows the HW thread to migrate to the local OCM data, which can increase overall performance. SW can also choose to build cluster groups up into SW pipeline groups to distribute the overall workload and to exploit HW cluster and thread parallelism.

According to a convenient embodiment, OCM (on-chip memory) is built using multiple single-ported SRAMs for the lowest area overhead (and optimal performance per unit area). To exploit cluster parallelism, the OCM is further distributed amongst clusters. Each cluster contains a portion of the OCM or "OCM partition," as well as 'n' HW-assist thread engines that can read (or write) the single-ported SRAMs. In so doing, multiple clusters can each be accessing their local OCM partition in parallel, which yields the best overall performance per unit area. In the event a lookup thread requires more address space than an OCM partition (i.e., single cluster), HW supports either remote OCM access via a crossbar, or HW thread migration (or work migration), which allows a HW thread to migrate to a different cluster where data to be worked on is located (as described, in detail, in one or more related applications).

According to embodiments of the present invention, a Lookup Engine (LUE) may be a physical network node (or device), such as a switch or router, in a network of other nodes. The LUE may be part of a physical network node (or device) as a component, module, blade or card of that node.

According to another embodiment of the present invention, the LUE is a general purpose computer having a processor, memory, communication interface, etc. (described in greater detail below in reference to FIG. 11). The general purpose computer is transformed into the LUF and its components, for example, by loading instructions into the processor that cause the computer to process lookup requests received from a host to determine the best match and return responses to the host.

Figure 11:
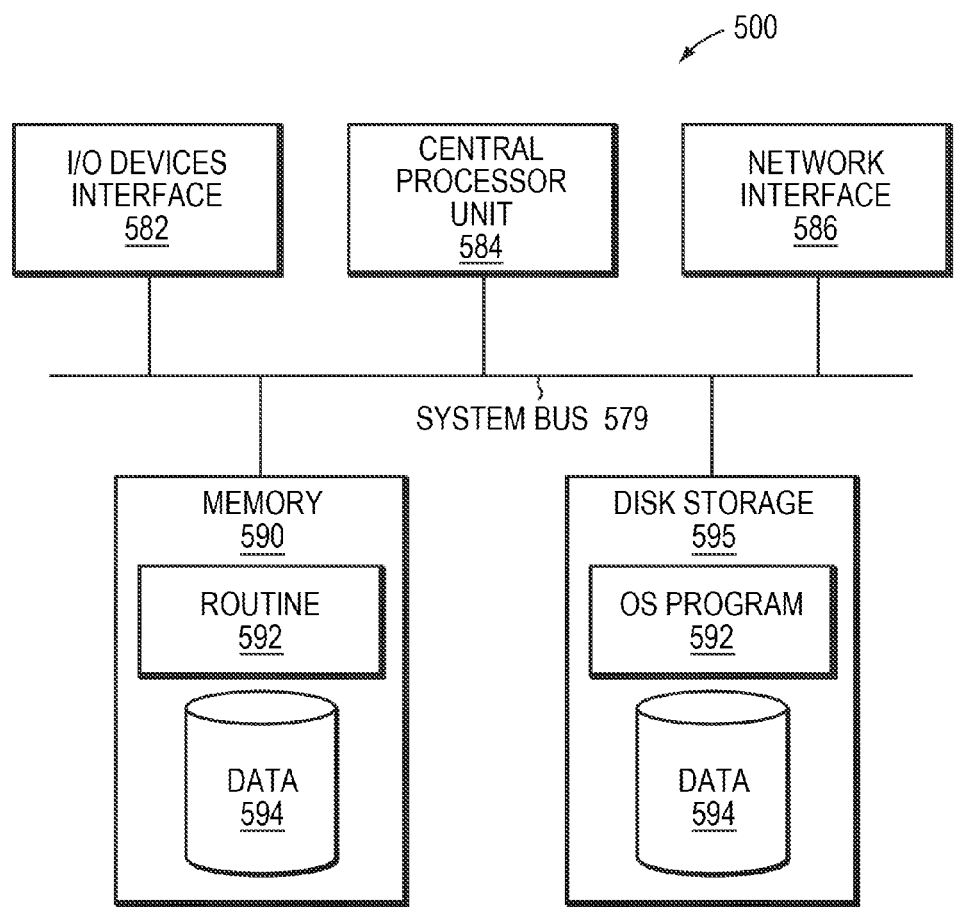
FIG. 11 is a block diagram of a computer in which various embodiments of the present disclosure may be implemented.

FIG. 11 is a block diagram of the internal structure of a computer 500 in which various embodiments of the present invention may be implemented. The computer 500 contains system bus 579, where a bus is a set of hardware lines used for data transfer among the components of a computer or processing system. Bus 579 is essentially a shared conduit that connects different elements of a computer system (e.g., processor, disk storage, memory, input/output ports, network ports, etc.) that enables the transfer of information between the elements. Attached to system bus 579 is I/O device interface 582 for connecting various input and output devices (e.g., keyboard, mouse, displays, printers, speakers, etc.) to the computer 500. Network interface 586 allows the computer 500 to connect to various other devices attached to a network. Memory 590 provides volatile storage for computer software instructions 592 and data 594 used to implement an embodiment of the present invention (e.g., the procedure of FIG. 8). Disk storage 595 provides non-volatile storage for computer software instructions 592 and data 594 used to implement an embodiment of the present invention. Central processor unit 584 is also attached to system bus 579 and provides for the execution of computer instructions.

In one embodiment, the processor routines 592 and data 594 are a computer program product (generally referenced 592), including a computer readable medium (e.g., a removable storage medium, such as one or more DVD-ROM's, CD-ROM's, diskettes, tapes, etc.) that provides at least a portion of the software instructions for embodiments of the invention system. Computer program product 592 can be installed by any suitable software installation procedure, as is well known in the art. In another embodiment, at least a portion of the software instructions may also be downloaded over a cable, communication and/or wireless connection.

Further, embodiments of the present invention may be implemented in a variety of computer architectures. The general computer of FIG. 11 is for purposes of illustration and not limitation of any embodiments of the present invention.

Figure 12:
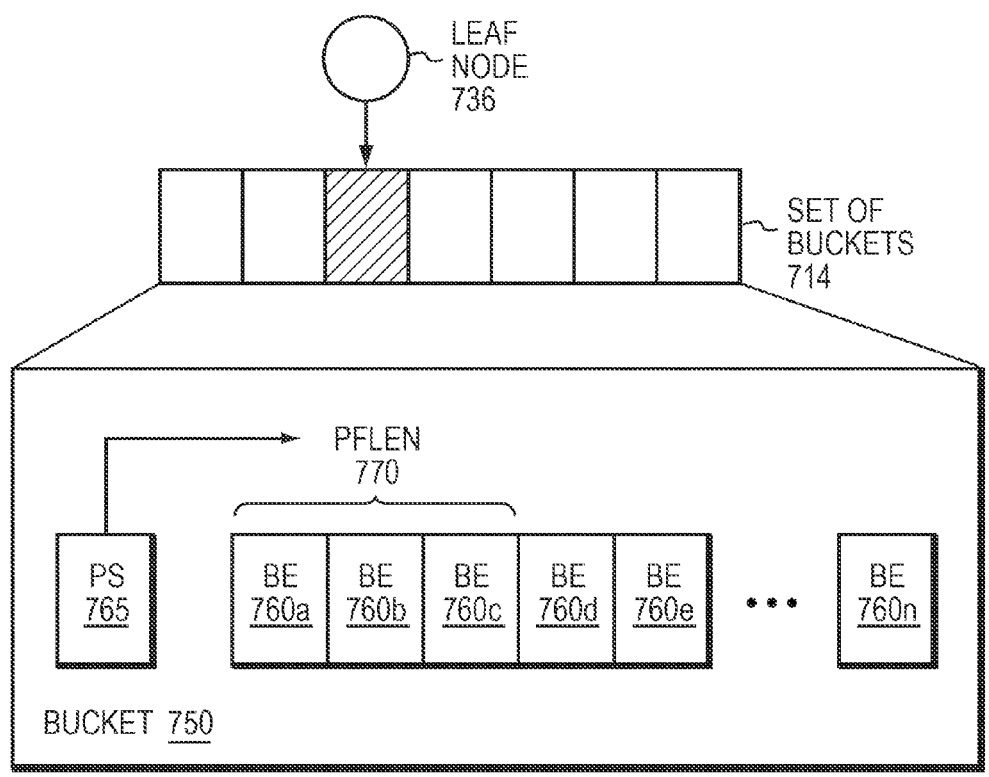
FIG. 12 is a block diagram of a memory structure, including a bucket, used to load rules for a given key in a packet.

FIG. 12 is a block diagram of a memory structure, including a bucket 750, used to load rules for a given key in a packet. The structure may be implemented in the compiler described above with reference to FIG. 7, and may include features of the memory structure described above with reference to FIG. 9A. For a given key, the TWE (e.g., TWE 660 in FIG. 6) walks the tree (e.g., tree 712 in FIG. 9A) to reach a leaf node 736 as shown in FIG. 12. The leaf node 736 may contain a pointer to a bucket 750 out of a set of buckets. With reference to FIG. 8, the TWE 504 sends the pointer to a BWE 514, which loads the bucket 750. The bucket 750 may include an ordered set of bucket entries 760a-n, each of which may include one or more pointers to rules or chunks of rules (e.g., pointers 718 to rules 746 as shown in FIG. 9A). The BWE 514 retrieves those bucket entries 760a-n, and may forward the respective pointers to a RME for retrieval of the respective rules or rule chunks.

In some embodiments, the BWE 514 may retrieve the bucket entries 760a-n one at a time and in an order corresponding to the order indicated by the bucket 750. However, in further embodiments, it may be advantageous to retrieve a selection of the bucket entries 760a-n (e.g., BEs 760a-c), and it may also be advantageous to process that selection without regard to the order indicated by the bucket 750. For example, it may be known that a packet is likely to match a rule indicated by one of the first few bucket entries (e.g., BEs 760a-c) of the bucket 750. (Buckets may be preconfigured such that rules with a higher probability of a match are located by the bucket entries 760a-n at the front of a bucket 750.) In such a case, RME capacity and memory bandwidth can be conserved by first retrieving only those first few bucket entries, and then terminating the search upon locating a match, retrieving additional bucket entries only in the case where a match is not found from those bucket entries. In addition, by processing those first few bucket entries out of order (e.g., in parallel by a plurality of RMEs operating simultaneously), a rule match can be obtained more quickly, and the RMEs will more likely remain occupied with corresponding rule-matching operations. By keeping the RMEs occupied, spikes in rule-matching requests may be minimized, which in turn minimizes processing bottlenecks at the RMEs.

In order to retrieve a selection of the bucket entries and process those entries out of order, the prefetch status 765 may be employed. The prefetch status 765 may include a "prefetch enable" bit indicating to the BWE whether to perform a prefetch, as well as a prefetch length value (PFLEN) 770, which indicates the number of bucket entries to prefetch. The prefetch status 765 may also include a "multiple prefetch enable" bit, which, when enabled, instructs the BWE to retrieve multiple groups of bucket entries simultaneously, where each group of bucket entries can be defined by the PFLEN or another value. Operation of a search cluster implementing a prefetch status 765 at a bucket 750 is described below with reference to FIGS. 13 and 14.

Figure 13:
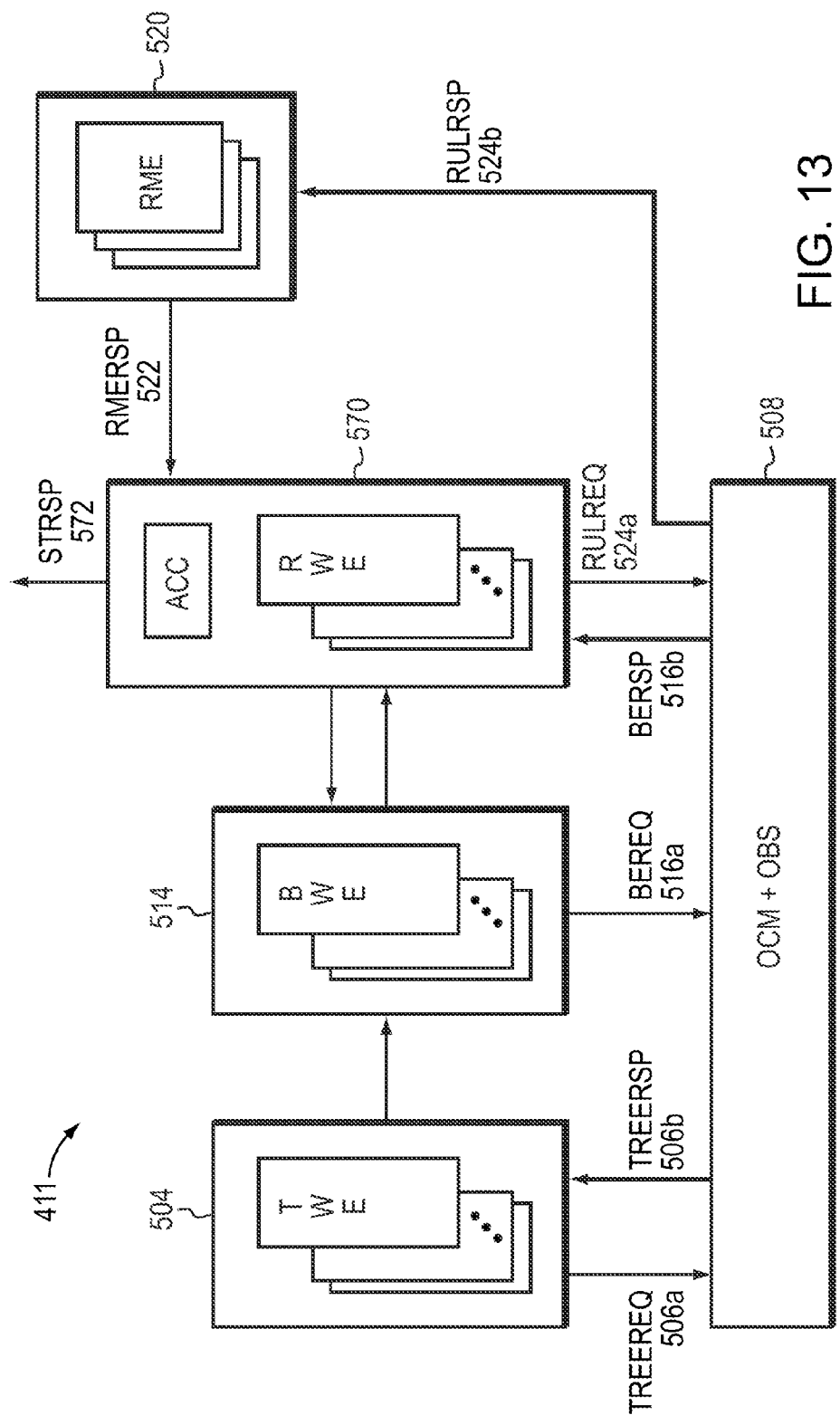
FIG. 13 is a block diagram illustrating an example embodiment of a search cluster.

FIG. 13 is a block diagram illustrating an example embodiment of a search cluster 411, which may include features of the search cluster 410 described above with reference to FIGS. 4A and 8. The search cluster 411 may include an on-chip memory (OCM) 508, a tree walk engine (TWE) 504, a bucket walk engine (BWE) 514, a rule walk engine (RWE) 570, and a plurality of rule match engines (RMEs) 520. The OCM 508 can store a tree data structure, a bucket storage data structure, and a chunk and/or rule data structure. In contrast to the search cluster 410 described above, the search cluster 411 is configured to include the RWE 570, which interfaces between the BWE 514, RME 520 and the memory 508, and can schedule rule requests in accordance with a bucket prefetch status.

The search cluster 411 receives a key 502 from the LUF 408 (FIG. 4A) at the TWE 504. The TWE 504 issues and receives a plurality of tree input/output (I/O) accesses 506a-b (i.e., "TREEREQ" and "TREERSP") to the OCM 508. Based on the key 502, the TWE 504 walks the tree from a root node to a possible leaf node. If the TWE 504 finds an appropriate leaf node, the leaf node can indicate a pointer to a bucket (e.g., bucket 750 in FIG. 12). The TWE 504 provides the pointer to the bucket to the BWE 514. The BWE 514 accesses bucket entries from the OCM 508 by issuing bucket entry requests ("BEREQ") 516a to the OCM 508. The RWE 570 receives the buckets entries (including pointers to rules) via a bucket entry response ("BERSP") 516b, retrieves the corresponding rules from the OCM 508 via a rule requests ("RULREQ") 524a. The RWE 570 may also include an accumulator scoreboard ("ACC") configured to track the pending out-of-order RME responses for each bucket. Corresponding rules are forwarded, via rule responses ("RULRSP") 524b to one of the RMEs 520 for rule matching against a key. The RMEs 520a-c then analyze the key using the rules accessed from the OCM 508 and issue a response 522 indicating a "match" or "no match" indicating whether the key matched the rule or chunk indicated by the tree and bucket stored in the OCM 508.

Figure 14:
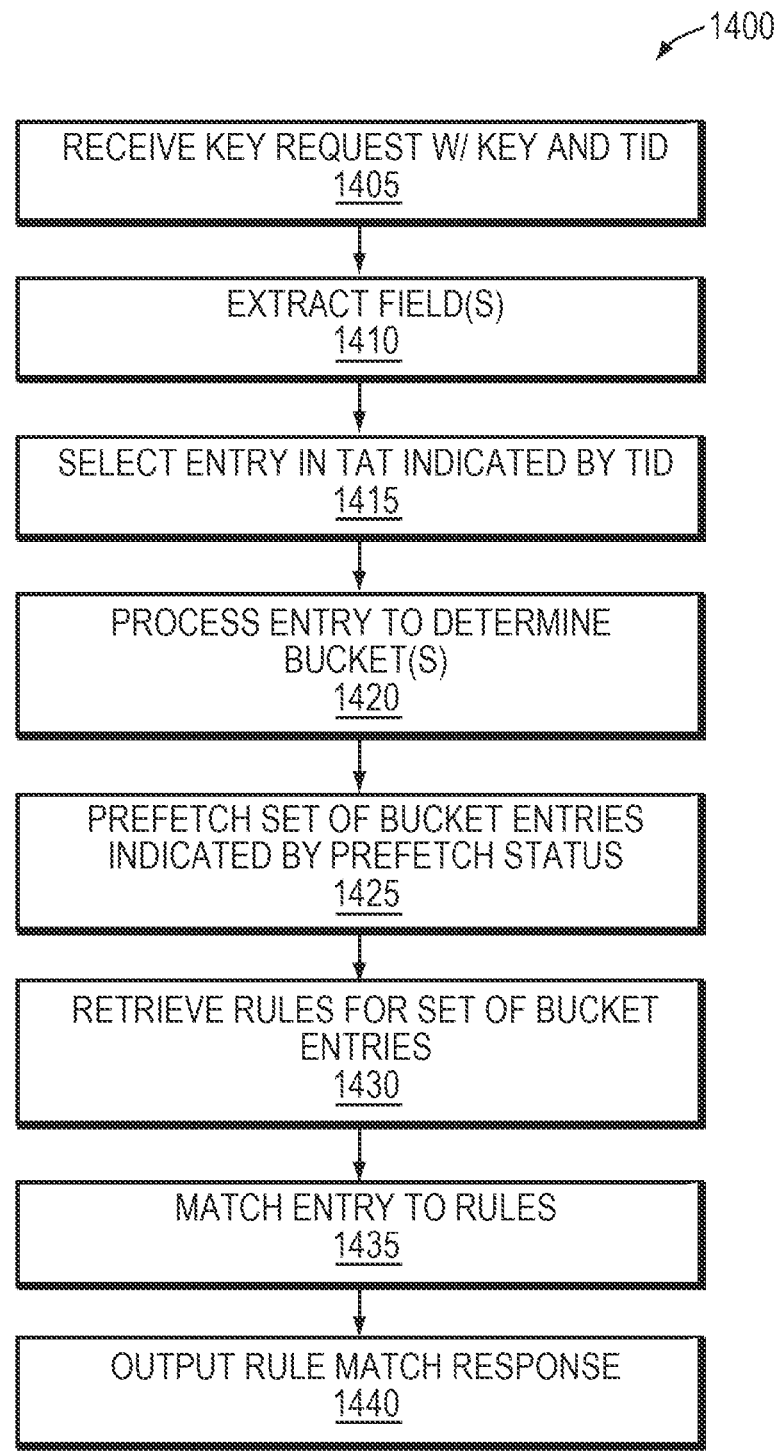
FIG. 14 is a flow diagram illustrating an example process of processing a key request using a bucket prefetch.

FIG. 14 is a flow diagram illustrating an example process 1400 of processing a key request using a bucket prefetch. With reference to FIG. 13, the TWE 504 receives a key request including a key and a TID, the key including data extracted from a packet (1405). The TWE 504 parses the key to extract at least one field to be matched against rules stored at the OCM 508 (1410). The TWE 504 then selects at least one entry in the tree access table (TAT) indicated by the TID (1415), and processes the entry (i.e., walking the tree from a root node to a leaf node) to determine corresponding bucket(s) (1420). For a given bucket (e.g., bucket 750 of FIG. 12) forwarded to the BWE 514, the BWE 514 reads the bucket's prefetch status. The prefetch status may be configured with variables described above with reference to FIG. 12, including a "prefetch enable" bit, a prefetch length value (PFLEN), and a "multiple prefetch enable" bit.

Based on the values indicated by the prefetch status of the bucket, the BWE 514 retrieves bucket entries accordingly (1425). If the prefetch status enables a prefetch, then the BWE 514 retrieves a selection of bucket entries indicated by the PFLEN (1425). If the prefetch status enables a multiple prefetch, then the BWE 514 may operate more than one ongoing bucket entry requests simultaneously (exemplified in FIGS. 15C-D, described below). Alternatively, if the prefetch status indicates that the prefetch is disabled, then the BWE 514 may retrieve bucket entries under a default configuration, such as serially in order following the order indicated by the bucket.

The RWE 570 receives the bucket entries and retrieves, from the OCM 508, corresponding rules that in turn are received by the RMEs 520 (1430). The RMEs 520 then process the key request by matching the entry to the retrieved rules (1435), and outputting a match response (1440). If the prefetch is enabled by the bucket's prefetch status, then the bucket entries may be processed "out of order" (i.e., in parallel). To accomplish parallel processing, the RMEs 520 may recruit multiple engines to process the entries of the given bucket simultaneously. The match response can be forwarded to the RWE 570 prior to output to a host. If the match response indicates a rule match, then the RWE 570 may also terminate pending rule requests for the given bucket, and may communicate with the BWE 514 to terminate pending bucket entry requests for the given bucket, thereby conserving memory bandwidth to the OCM 508 and capacity of the RMEs 520.

FIGS. 15A-D are timing diagrams illustrating cases of retrieving rules according to different prefetch statuses. In the case shown in FIG. 15A, the prefetch status indicates that prefetch is enabled, multiple prefetch is disabled, PFLEN is set to four BEs, and a prefetch cache (PFCACHE) is disabled. Accordingly, in a single thread ("phase A"), a selection of four bucket entry requests (BEREQs) as indicated by the PFLEN are forwarded to retrieve bucket entries (via bucket entry responses ("BERSP")), followed by corresponding rule requests (RULREQs). If the first bucket prefetch fails to lead to a rule match, then a second bucket entry request can be forwarded, providing pointers to additional rules for matching against the key.

Figure 15A:
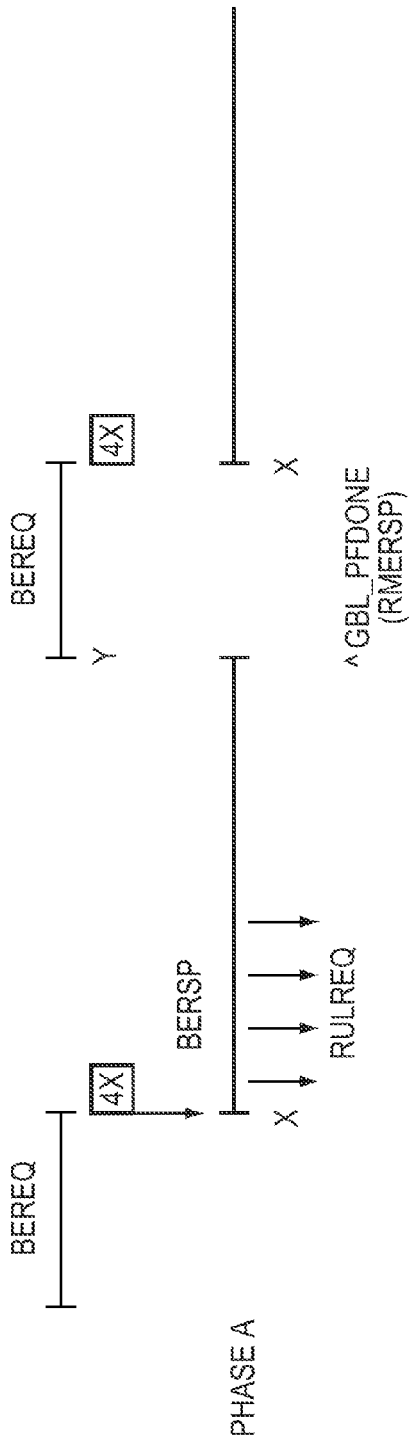
FIGS. 15A-D are timing diagrams illustrating cases of retrieving rules according to different prefetch statuses.
Figure 15B:
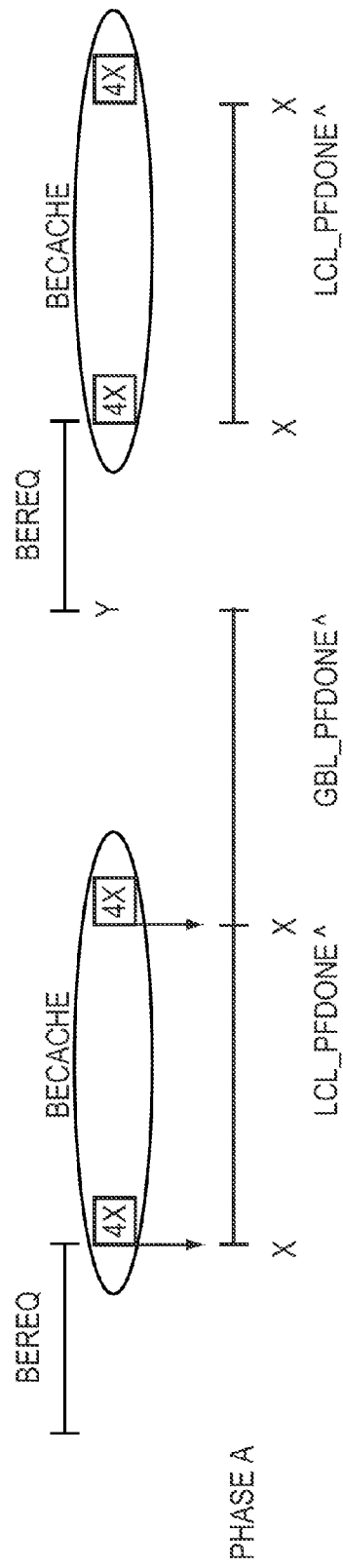

In the case shown in FIG. 15B, the prefetch status indicates that prefetch is enabled, multiple prefetch is disabled, PFLEN is set to four BEs, and a prefetch cache (PFCACHE) is enabled. Accordingly, in a single thread ("phase A"), a selection of bucket entry requests (BEREQs) as indicated by the PFLEN are forwarded to retrieve bucket entries (via bucket entry responses "BERSPs"). Because the prefetch cache is enabled, the selection of bucket entries retrieved may be larger than the number specified by the PFLEN, and the additional bucket entries are stored at a cache (e.g., a bucket entry cache, "BECACHE"). As a result of caching these additional bucket entries, they will be available to the RWE immediately from the cache without requiring the BWE to forward a further bucket entry request.

Figure 15C:
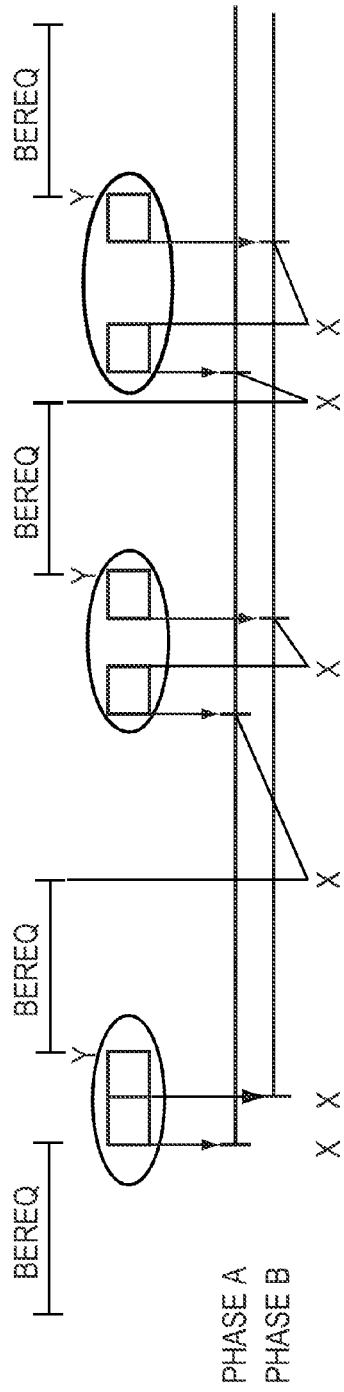

In the case shown in FIG. 15C, the prefetch status indicates that prefetch is enabled, multiple prefetch is enabled, PFLEN is set to four BEs, and a prefetch cache (PFCACHE) is enabled. Accordingly, two threads ("phase A" and "phase B") are operated in parallel to retrieve bucket entries. Within each thread, a selection of four bucket entry requests (BEREQs) as indicated by the PFLEN are forwarded to retrieve bucket entries (via bucket entry responses ("BERSP")), followed by corresponding rule requests (RULREQs). As a result of caching additional bucket entries at the BECACHE for each thread, they will be available to the RWE immediately from the cache without requiring the BWE to forward a further bucket entry request. If the first bucket prefetch fails to lead to a rule match, then a second bucket entry request can be forwarded, providing pointers to additional rules for matching against the key.

Figure 15D:
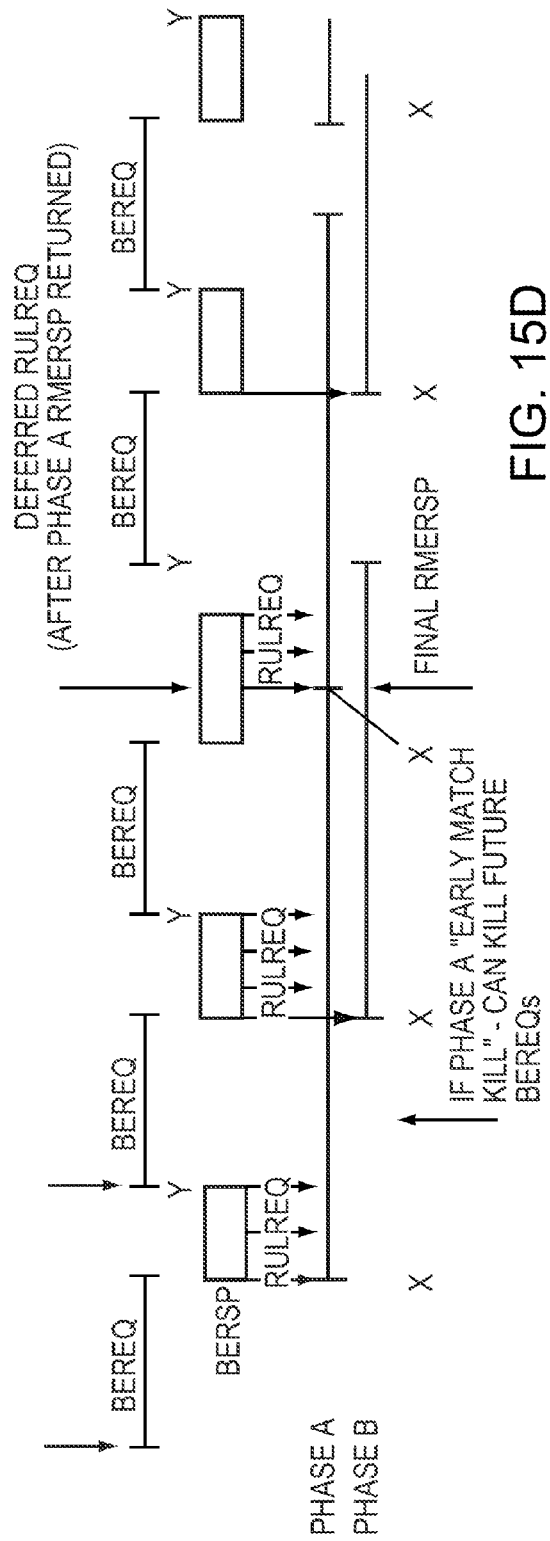

In the case shown in FIG. 15D, the prefetch status indicates that prefetch is enabled, multiple prefetch is enabled, PFLEN is set to eight BEs, and a prefetch cache (PFCACHE) is enabled. Accordingly, two threads ("phase A" and "phase B") are operated in parallel to retrieve bucket entries. Due to the larger PFLEN, an initial rule request at the second phase ("phase B") can be deferred until after a rule match response is returned in the first phase ("phase A"). Moreover, the BWE can launch a subsequent BE request after all rule requests from a current PFLEN BE group (or phase) have been issued to the OBS. Within each thread, a selection of four bucket entry requests (BEREQs) as indicated by the PFLEN are forwarded to retrieve bucket entries (via bucket entry responses ("BERSP")), followed by corresponding rule requests (RULREQs). As a result of caching additional bucket entries at the BECACHE for each thread, they will be available to the RWE immediately from the cache without requiring the BWE to forward a further bucket entry request. If the first bucket prefetch fails to lead to a rule match, then a second bucket entry request can be forwarded, providing pointers to additional rules for matching against the key.

While this invention has been particularly shown and described with references to example embodiments thereof, it will be understood by those skilled in the art that various changes in form and details may be made therein without departing from the scope of the invention encompassed by the appended claims.

Embodiments may be implemented in hardware, firmware, software, or any combination thereof. Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transitory machine-readable medium may include read only memory (ROM); random access memory (RAM); magnetic disk storage media; optical storage media; flash memory devices; and others. Further, firmware, software, routines, or instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the block and flow diagrams (e.g., FIG. 14) may include more or fewer elements, be arranged differently, or be represented differently. It should be understood that implementation may dictate the block and flow diagrams and the number of block and flow diagrams illustrating the execution of embodiments of the invention.

What is claimed is:

1. An apparatus for processing a packet comprising:
    a tree walk engine (TWE) configured to:
        receive a key request including a key and a table identifier (TID), the key including data extracted from a packet;
        parse the key to extract at least one field;
        select at least one entry in a tree access table indicated by the TID, the entry providing a starting address of a set of rules stored in a memory; and
        process the entry, based on the at least one field, to determine at least one bucket having a prefetch status and an ordered set of bucket entries, the bucket entries including pointers to respective subsets of rules, the subsets of rules each being a portion of the set of rules;
    a bucket-walk engine (BWE) configured to retrieve a selection of the subsets of rules from the memory, the selection corresponding to a configuration of the prefetch status;
    a rule-matching engine (RME) configured to apply the at least one field against each subset of rules of the selection and output a response signal indicating whether the at least one field matches at least one rule of the subsets of rules.

2. The apparatus of claim 1, wherein the RME is configured to apply the at least one field against each subset of rules independent of an order of the respective bucket entries.

3. The apparatus of claim 1, wherein the RME is configured to apply the at least one field against each subset of rules in parallel.

4. The apparatus of claim 1, wherein the BWE, in response to the response signal indicating a match, terminates retrieving additional subsets of rules for the ordered set of bucket entries.

5. The apparatus of claim 1, further comprising a rule-walk engine (RWE), the BWE retrieving the selection of the subsets of rules from the memory via the RWE.

6. The apparatus of claim 1, wherein the prefetch status includes an indication to enable or disable a prefetch of the selection of the subsets of rules from the memory.

7. The apparatus of claim 6, wherein the BWE, in response to a disable indication, retrieves the subsets of rules in an order corresponding to the ordered set of bucket entries.

8. The apparatus of claim 6, wherein the RME, in response to a disable indication, applies the at least one field against the subsets of rules serially in an order corresponding to the ordered set of bucket entries.

9. The apparatus of claim 1, wherein the prefetch status includes an indication of a number of bucket entries in the selection.

10. The apparatus of claim 1, wherein the BWE, in response to the response signal indicating no match, retrieves at least one subset of rules from the memory, the at least one subset of rules being distinct from the selection.

11. A method of processing a packet comprising:
    receiving a key request including a key and a table identifier (TID), the key including data extracted from a packet;
    parsing the key to extract at least one field;
    selecting at least one entry in a tree access table indicated by the TID, the entry providing a starting address of a path to a set of rules stored in a memory;
    processing the entry, based on the at least one field, to determine at least one bucket having a prefetch status and an ordered set of bucket entries, the bucket entries including pointers to respective subsets of rules, the subsets of rules each being a portion of the set of rules;
    retrieving a selection of the subsets of rules from the memory, the selection corresponding to a configuration of the prefetch status;
    applying the at least one field against the subset of rules; and
    outputting a response signal indicating whether the at least one field matches at least one rule of the subset of rules.

12. The method of claim 11, wherein the at least one field is applied against each subset of rules independent of an order of the respective bucket entries.

13. The method of claim 11, wherein the at least one field is applied against each subset of rules in parallel.

14. The method of claim 11, further comprising, in response to the response signal indicating a match, terminating retrieving additional subsets of rules for the ordered set of bucket entries.

15. The method of claim 11, wherein the prefetch status includes an indication to enable or disable a prefetch of the selection of the subsets of rules from the memory.

16. The method of claim 15, further comprising, in response to a disable indication, retrieving the subsets of rules in an order corresponding to the ordered set of bucket entries.

17. The method of claim 15, further comprising, in response to a disable indication, applying the at least one field against the subsets of rules serially in an order corresponding to the ordered set of bucket entries.

18. The method of claim 11, wherein the prefetch status includes an indication of a number of bucket entries in the selection.

19. The method of claim 11, further comprising, in response to the response signal indicating no match, retrieving at least one subset of rules from the memory, the at least one subset of rules being distinct from the selection.

* * * * *